(12) United States Patent
Uyama

(10) Patent No.: US 8,200,432 B2
(45) Date of Patent: Jun. 12, 2012

(54) ROUTE GUIDANCE SYSTEM, ROUTE SEARCH SERVER, ROUTE GUIDANCE METHOD, AND TERMINAL

(75) Inventor: Hiroshi Uyama, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 0 days.

(21) Appl. No.: 12/989,275

(22) PCT Filed: Apr. 28, 2008

(86) PCT No.: PCT/JP2008/058182
§ 371 (c)(1),
(2), (4) Date: Oct. 22, 2010

(87) PCT Pub. No.: WO2009/133596
PCT Pub. Date: Nov. 5, 2009

(65) Prior Publication Data
US 2011/0040479 A1    Feb. 17, 2011

(51) Int. Cl.
*G01C 21/34* (2006.01)
(52) U.S. Cl. ........ 701/533; 701/461; 701/462; 701/532; 340/995.18; 340/995.19
(58) Field of Classification Search .................. 701/200, 701/201, 207, 208, 209, 210; 707/769, 770, 707/E17.018; 340/995.12, 995.18
See application file for complete search history.

(56) References Cited

U.S. PATENT DOCUMENTS 6,564,224 B1 * 5/2003 Wu et al. ............................... 1/1
6,574,553 B1 * 6/2003 Beesley et al. ................ 701/209
(Continued)

FOREIGN PATENT DOCUMENTS
DE    10 2005 044 419 A1    3/2006
(Continued)

OTHER PUBLICATIONS

Notification of Transmittal of Translation of the International Preliminary Report on Patentability (Form PCT/IB/338) of International Application No. PCT/JP2008/058182 mailed Dec. 23, 2010 with forms PCT/IB/373, PCT/ISA/237 and PCT/IB/326.

(Continued)

*Primary Examiner* — Thomas Black
*Assistant Examiner* — Peter D Nolan
(74) *Attorney, Agent, or Firm* — Westerman, Hattori, Daniels & Adrian, LLP

(57) ABSTRACT

First and second route guidance systems provided with country or region-specific map data or route search network data are linked. If the departure place and the destination are in different areas, a first route guidance system (A) extracts a candidate connection which is the border between the different areas to transmit it to a second route guidance system (B). The first and second route guidance systems search the optimum route from the departure place to the candidate connection and the optimum candidate route from the candidate connection to the destination, respectively and provide the required time and link data to their respective route guidance systems. The first or second route guidance system determines a recommended route with the smallest total of the required time out of candidate routes connected at the candidate connection and provides the recommended route data including the link data from the first route guidance system (A) to a terminal (20). The terminal (20) requests route guidance to the first or second route guidance system on the basis of the recommended route data depending on the area in which it is located.

16 Claims, 10 Drawing Sheets

U.S. PATENT DOCUMENTS

| | | | |
|---|---|---|---|
| 6,574,554 B1 * | 6/2003 | Beesley et al. | 701/209 |
| 6,636,804 B1 * | 10/2003 | Joshi | 701/208 |
| 6,708,112 B1 * | 3/2004 | Beesley et al. | 701/209 |
| 7,389,179 B2 * | 6/2008 | Jin et al. | 701/207 |
| 7,801,904 B2 * | 9/2010 | Natesan et al. | 707/758 |
| 2002/0173905 A1 * | 11/2002 | Jin et al. | 701/207 |
| 2005/0102101 A1 * | 5/2005 | Beesley et al. | 701/209 |
| 2005/0165539 A1 * | 7/2005 | Hahlweg et al. | 701/200 |
| 2006/0167601 A1 * | 7/2006 | Henning et al. | 701/30 |
| 2007/0038370 A1 * | 2/2007 | Chang | 701/211 |
| 2008/0255756 A1 | 10/2008 | Friedrichs et al. | |

FOREIGN PATENT DOCUMENTS

| | | |
|---|---|---|
| EP | 1 092 950 A1 | 4/2001 |
| EP | 1544576 A1 | 6/2005 |
| JP | 9-292250 A | 11/1997 |
| JP | 2001-165681 A | 6/2001 |
| JP | 2002-243477 A | 8/2002 |
| JP | 2003-097960 A | 4/2003 |
| JP | 2007-218770 A | 8/2007 |
| WO | 2006/018337 A1 | 2/2006 |

OTHER PUBLICATIONS

International Search Report of PCT/JP2008/058182, mailing date Jun. 10, 2008.

European Search Report dated Jun. 9, 2011, issued in corresponding European Patent Application No. 08752195.1.

* cited by examiner

ROUTE GUIDANCE SYSTEM, ROUTE SEARCH SERVER, ROUTE GUIDANCE METHOD, AND TERMINAL

TECHNICAL FIELD

The present invention relates to a route guidance system for searching and providing guidance for a candidate route from a desired departure place to a destination via walking, automobile, or public transportation systems; and the present invention particularly relates to a route guidance system, a route search server, a route guidance method, and a terminal, whereby when a search is conducted and guidance is provided for a route encompassing more than one country or region, route guidance systems provided with country or region-specific map data and route search network data are linked, and a series of route guidance services from the departure place to a destination in another country or region is smoothly transferred from system to system.

BACKGROUND ART

In conventional practice, there have been known navigation devices and navigation systems for searching for a route from a desired departure place to a destination and guiding a user using map data and road data. Practical applications of such navigation devices and navigation systems have included communication-type navigation systems and the like in which a portable phone or a car navigation device installed in an automobile for providing route guidance to a driver is used as a terminal for navigation, a route search request is sent to the route search server, the result is transmitted, and route guidance is received.

Particularly, communication-type navigation systems are used as navigation systems for pedestrians. Other examples of navigation systems for pedestrians include navigation systems which are preferably equipped with a route guidance function that includes a transportation system; and which, in addition to searches and guidance of walking routes, have a function for storing transportation system lines and operating time data for railroads, aircraft, buses, and the like in a route search server, and for providing guidance of routes from desired departure stations to desired destination stations (ridden candidate trains) in addition to searches of and guidance for walking routes. There are also transportation guidance systems which receive and display the distribution of information on lines and time schedules of transportation systems, rideable trains, and the like from an information distribution server without a route search for a walking route.

A route search device and route search method used in a common navigation device and communication navigation system is disclosed in Patent Document 1 (Japanese Laid-open Patent Application No. 2001-165681), for example. This navigation system is configured so as to send information on the departure place and destination from a portable navigation terminal to an information distribution server, and to search for and provide guidance for a route conforming to the search conditions from data on road networks and transportation networks using the information distribution server. The means for moving from the departure place to the destination, e.g., walking, automobile, railroad, aircraft, or other public transportation, or a combination of walking and public transportation are included in the search conditions, and these means are treated as one search condition in a route search.

The information distribution server is provided with map data roads (routes), wherein the nodal points and turning points thereof are nodes, the routes joining nodes together are links, and the cost information (distance and required time) of all the links is the database. The information distribution server can provide a portable navigation terminal with guidance for the shortest possible route by referring to the database, sequentially searching for links extending from the node of the departure place and the node of the destination, and creating a guidance route from the nodes and links having the smallest possible link cost information. Either a method known as the label-correcting method or a method known as the Dijkstra method is used as the method of this manner of route search. In Patent Document 1 hereinbelow, a route search method that uses the Dijkstra method is also disclosed.

A route search system that searches for routes using a transportation system is provided with an operation time database consisting of operation time data of transportation systems incorporated into a database on the basis of a departure date and time, a departure place, a destination, an arrival time, and other route search conditions indicated by a user; and data consisting of a transportation network incorporated into a database on the basis of the operation time database. The configuration is designed so that these databases are referenced, useable transportation means (individual trains and line buses) connecting the departure place to the destination including connections (transfers) are sequentially followed as routes, and one or more candidates of guidance routes (the departure place station, the destination station, lines, trains, and other transportation means) conforming to the route search conditions are suggested. It is common to ensure that the required time, the number of connections, fares, and other conditions can also be designated as route search conditions.

The map data and route search network data provided to a common route guidance system are data on the regions (also known as service target areas) in which the system provides route guidance service. For example, with a normal route guidance system, the regions within a certain country's borders will be the service target, or a specific region within the country's borders will be the service target.

In this case, if the departure place and the destination are within the service target area of the route guidance system, there are no obstacles whatsoever to the route search and the route guidance. However, if the departure place is within the borders of a certain country and the destination is within the borders of another country, it is not possible to search and provide guidance for the total routes from the departure place to the destination. This is because the routes that can be searched and that can have guidance provided by the route guidance system in the departure place are within the range of the country of the departure place, and these routes do not include map data or route search network data of the other country of the destination.

In an on-board navigation device or the like, map data or route search network data of a specified map is stored in the navigation device installed in the vehicle, and when a point outside of the area of the map is designated as the destination, a method is used in which either a route search request is sent to a server having map data or route search network data of the country including the other region, or the map data or route search network data of the needed region is downloaded and a route search is enabled in the navigation device.

For example, an invention of this type of route guidance device is disclosed in the following Patent Document 2 (Japanese Laid-open Patent Application No. 2003-97960). With this route guidance device, when a route search is conducted from a departure place to a destination in a center, a plurality of starting points along the route are marked as candidates. When the starting points are transmitted to the route guidance device, the route guidance device determines which starting points are guide-capable and transmits them to the center. The configuration is designed so that the center performs route searches from the departure place to the starting points, and the guidance device performs route searches from the starting points to the destination, so that the optimum route from the departure place to the destination is provided.

[Patent Document 1]
Japanese Laid-open Patent Application No. 2001-165681 (FIGS. 1 and 2)

[Patent Document 2]
Japanese Laid-open Patent Application No. 2003-97960 (FIGS. 1 and 2)

DISCLOSURE OF THE INVENTION

Problems the Invention is Intended to Solve

As previously described, there are cases in which it is not possible to provide route guidance service merely by using map data or route search network data provided to a certain route guidance system in order to provide service. As in the invention of the route guidance device disclosed in the aforementioned Patent Document 2, it is possible to comply with the user's request if another route guidance system is linked, the portion for which the first route guidance system cannot conduct a route search is searched using the route search function of the other route guidance system, and the guidance routes searched by both route guidance systems can be combined.

However, in some countries, providing map data or data of road networks or transportation networks to another country may be prohibited. Such restrictions are primarily for national security reasons. In the route guidance device disclosed in the aforementioned Patent Document 2, the map data carried by the route guidance device is map data of partial areas, and the server is a system assumed to carry map data of the entire country including map data of partial areas carried by the navigation device.

In a route guidance system, route search network data must be created from information on map data, road networks, and transportation networks and carried as a database, and a map database storing map information must be carried in order to guide users along routes. When the route guidance system attempts to provide service outside of the country, the route guidance system requires map data or data of road networks or transportation networks, not of its own country, but of the other country for which it is attempting to provide service. Therefore, there is a problem in such cases in that the technique of the route guidance device disclosed in the aforementioned Patent Document 2 cannot be applied.

As a result of various studies intended to resolve the problems described above, the inventors of the present invention perfected the present invention by envisioning that the problems described above could be resolved if, when a search is conducted and guidance provided for a route spanning between countries or regions, route guidance systems provided with country or region-specific map data and route search network data are linked, the route guidance systems exchange point information of a plurality of candidate connections in movement means connecting the countries or regions on the basis of point information of a departure place and a destination, the route guidance systems search for candidate routes between the departure place or the destination and the candidate connections and exchange data of the candidate connections and candidate routes, the candidate routes searched by one route guidance system within its own route guidance system and the candidate routes searched by the other route guidance system are integrated at the candidate connections by the one route guidance system or the other route guidance system, the integrated route having the smallest cost from the departure place to the destination is designated as an optimum recommended route, and this recommended route is provided to a terminal.

In other words, an object of the present invention is to resolve the problems described above, and to provide a route guidance system designed so that when a search is conducted and guidance is provided for a route spanning between countries or regions using roads or transportation systems, route guidance systems provided with country or region-specific map data and route search network data are linked, and a series of route guidance services from the departure place to a destination in another country or region can be smoothly transferred from system to system.

Means for Resolving These Problems

To resolve the problems previously described, the invention according to a first aspect of the present application is a first route guidance system configured from a first route search server, which comprises a map database that has a predetermined area as a serviceable area and that stores map data of the area, and a route search network database for storing road network data and transportation network data of the area; and a terminal connected to the first route search server via a network; the route guidance system characterized in that:

the first route search server has candidate connection extracting means for extracting point information of at least one candidate connection enabling arriving at a different area outside of the serviceable area, and route searching means for searching for an optimum route as a candidate route between a departure place or a destination and the candidate connection;

in a case in which a route search request is received from the terminal such that a point inside the serviceable area is the departure place and a point inside a different area outside of the serviceable area is the destination, the first route search server searches for an optimum candidate route from the departure place to the candidate connection, transmits point information of the destination and point information of the candidate connection to a second route search server constituting a second route guidance system whose serviceable area is the different area, and requests that the second route search server search for an optimum candidate route from the candidate connection to the destination; and the second route search server provides the first route search server with link data of the candidate route leading to the destination;

either the first route search server or the second route search server has candidate route combining means for combining required times of the respective searched candidate routes on the basis of the candidate connection, and recommended route determining means for designating as a recommended route the candidate route having the shortest required time on the basis of the required times of the candidate routes combined by the candidate route combining means; and the first route search server transmits to the terminal the data of the recommended route including the link data of the candidate route provided from the second route search server, on the basis of the recommended route determined by the recommended route determining means.

The invention according to a second aspect of the present application is the invention according to the first aspect, characterized in that based on the candidate connection received from the first route search server and the required time of the candidate route, the candidate route combining means of the second route search server combines the required time of the candidate route searched by the first route search server with the required time of the candidate route from the candidate connection to the destination; and based on the required time of the combined candidate routes, the recommended route determining means of the second route search server designates the candidate route having the shortest required time as a recommended route, and provides the first route search server with data of the recommended route including link data of the candidate route from the candidate connection to the destination constituting the recommended route.

The invention according to a third aspect of the present application is the invention according to the first aspect, characterized in that the candidate route combining means of the first route search server receives required times of candidate routes and link data from the second route search server, and combines the candidate route searched by the second route search server and the candidate route searched by the first route search server on the basis of the candidate connection; the recommended route determining means of the first route search server designates the candidate route having the least required time as a recommended route on the basis of the required times of the combined candidate routes; and recommended route data is transmitted to the terminal, the recommended route data including link data of the candidate route from the candidate connection to the destination constituting the recommended route.

The invention according to a fourth aspect of the present application is the invention according to the second or third aspect, characterized in that the second route search server has candidate connection extracting means, and when a candidate connection that is different from the candidate connection transmitted from the first route search server is extracted on the basis of the point information of the destination, the point information of the different candidate connection is transmitted to the first route search server.

The invention according to a fifth aspect of the present application is the invention according to the first aspect, characterized in that, based on the recommended route data received from the first route search server, the terminal requests route guidance from the first route search server when the terminal is located in the area to which the first route search server provides service, and the terminal requests route guidance from the second route search server whose serviceable area is the different area when the terminal is located in the different area.

The invention according to a sixth aspect of the present application is:

a route guidance method in a route guidance system configured from a first route search server, which comprises a map database that has a predetermined area as a serviceable area and that stores map data of the area, and a route search network database for storing road network data and transportation network data of the area; and a terminal connected to the first route search server via a network; the route search guidance method characterized in that:

the first route search server has candidate connection extracting means for extracting point information of at least one candidate connection enabling arriving at a different area outside of the serviceable area, and route searching means for searching for an optimum route as a candidate route between a departure place or a destination and the candidate connection;

in a case in which a route search request is received from the terminal such that a point inside the serviceable area is the departure place and a point inside a different area outside of the serviceable area is the destination, the method has a step wherein the first route search server searches for an optimum candidate route from the departure place to the candidate connection, a step wherein point information of the destination and point information of the candidate connection is transmitted to a second route search server constituting a second route guidance system whose serviceable area is the different area and a request is made for a search for an optimum candidate route from the candidate connection to the destination, and a step wherein the second route search server provides the first route search server with link data of the candidate route leading to the destination;

either the first route search server or the second route search server has candidate route combining means for combining required times of the respective searched candidate routes on the basis of the candidate connection, and recommended route determining means for designating as a recommended route the candidate route having the shortest required time on the basis of the required times of the candidate routes combined by the candidate route combining means; and the method has a step wherein, on the basis of the recommended route determined by the recommended route determining means, the first route search server transmits to the terminal the data of the recommended route including the link data of the candidate route provided from the second route search server.

The invention according to a seventh aspect of the present application is the invention according to the sixth aspect, characterized in comprising a step wherein based on the candidate connection received from the first route search server and the required time of the candidate route, the candidate route combining means of the second route search server combines the required time of the candidate route searched by the first route search server with the required time of the candidate route from the candidate connection to the destination; a step wherein based on the required time of the combined candidate routes, the recommended route determining means of the second route search server designates the candidate route having the shortest required time as a recommended route; and a step wherein the first route search server is provided with data of the recommended route including link data of the candidate route from the candidate connection to the destination constituting the recommended route.

The invention according to an eighth aspect of the present application is the invention according to the sixth aspect, characterized in comprising a step wherein the candidate route combining means of the first route search server receives required times of candidate routes and link data from the second route search server, and combines the candidate route searched by the second route search server and the candidate route searched by the first route search server on the basis of the candidate connection; a step wherein the recommended route determining means of the first route search server designates the candidate route having the least required time as a recommended route on the basis of the required times of the combined candidate routes; and a step wherein recommended route data is transmitted to the terminal, the recommended route data including link data of the candidate route from the candidate connection to the destination constituting the recommended route.

The invention according to a ninth aspect of the present application is the invention according to the seventh or eighth aspect, characterized in that the second route search server has candidate connection extracting means; and the method has a step wherein, in a case where a candidate connection that is different from the candidate connection transmitted from the first route search server is extracted on the basis of the point information of the destination, the second route search server transmits to the first route search server the point information of the different candidate connection.

The invention according to a tenth aspect of the present application is the invention according to the sixth aspect, characterized in comprising a step wherein, based on the recommended route data received from the first route search server, the terminal requests route guidance from the first route search server when the terminal is located in the area to which the first route search server provides service; and a step wherein the terminal requests route guidance from the second route search server whose serviceable area is the different area when the terminal is located in the different area.

The invention according to an eleventh aspect of the present application is:

a route search server configured from a route search server comprising a map database which has a predetermined area as a serviceable area and which stores map data of the area, and a route search network database which stores road network data and transportation network data of the area; and a terminal connected to the route search server via a network; the route search server characterized in that:

the route search server has candidate connection extracting means for extracting point information of at least one candidate connection enabling arriving at a different area outside of the serviceable area, and route searching means for searching for an optimum route as a candidate route between a departure place or a destination and the candidate connection;

in a case in which a route search request is received from the terminal such that a point inside the serviceable area is the departure place and a point inside a different area outside of the serviceable area is the destination, the route search server searches for an optimum candidate route from the departure place to the candidate connection, transmits point information of the destination and point information of the candidate connection to a second route search server whose serviceable area is the different area, and requests that the second route search server search for an optimum candidate route from the departure place to the destination via the candidate connection; and the second route search server provides the route search server with link data of the candidate route leading to the destination;

either the route search server or the second route search server has candidate route combining means for combining required times of the respective searched candidate routes on the basis of the candidate connection, and recommended route determining means for designating as a recommended route the candidate route having the shortest required time on the basis of the required times of the candidate routes combined by the candidate route combining means; and the route search server transmits to the terminal the data of the recommended route including the link data of the candidate route provided from the second route search server, on the basis of the recommended route determined by the recommended route determining means.

The invention according to a twelfth aspect of the present application is the invention according to the eleventh aspect, characterized in that based on the candidate connection received from the route search server and the required time of the candidate route, the candidate route combining means of the second route search server combines the required time of the candidate route searched by the route search server with the required time of the candidate route from the candidate connection to the destination; based on the required time of the combined candidate routes, the recommended route determining means of the second route search server designates the candidate route having the shortest required time as a recommended route, and provides the route search server with data of the recommended route including link data of the candidate route from the candidate connection to the destination constituting the recommended route; and the route search server transmits to the terminal the data of the recommended route including link data of the candidate route provided from the second route search server.

The invention according to a thirteenth aspect of the present application is the invention according to the eleventh aspect, characterized in that the candidate route combining means of the route search server receives required times of candidate routes and link data from the second route search server, and combines the candidate route searched by the second route search server and the candidate route searched by the route search server on the basis of the candidate connection; the recommended route determining means of the route search server designates the candidate route having the least required time as a recommended route on the basis of the required times of the combined candidate routes; and recommended route data is transmitted to the terminal, the recommended route data including link data of the candidate route from the candidate connection to the destination constituting the recommended route.

The invention according to a fourteenth aspect of the present application is the invention according to the twelfth or thirteenth aspect, characterized in that the second route search server has candidate connection extracting means; and, when a candidate connection that is different from the candidate connection transmitted from the first route search server is extracted on the basis of the point information of the destination, the point information of the different candidate connection is transmitted to the route search server.

The invention according to a fifteenth aspect of the present application is:

a terminal in a route guidance system configured from a route search server comprising a map database which has a predetermined area as a serviceable area and which stores map data of the area, and a route search network database which stores road network data and transportation network data of the area; and a terminal connected to the route search server via a network; the terminal characterized in that:

the route search server has candidate connection extracting means for extracting point information of at least one candidate connection enabling arriving at a different area outside of the serviceable area, and route searching means for searching for an optimum route as a candidate route between a departure place or a destination and the candidate connection;

in a case in which a route search request is received from the terminal such that a point inside the serviceable area is the departure place and a point inside a different area outside of the serviceable area is the destination, the route search server searches for an optimum candidate route from the departure place to the candidate connection, transmits point information of the destination and point information of the candidate connection to a second route search server whose serviceable area is the different area, and requests that the second route search server search for an optimum candidate route from the candidate connection to the destination; and the second route search server provides the route search server with link data of the candidate route leading to the destination;

either the route search server or the second route search server has candidate route combining means for combining required times of the respective searched candidate routes on the basis of the candidate connection, and recommended route determining means for designating as a recommended route the candidate route having the shortest required time on the basis of the required times of the candidate routes combined by the candidate route combining means; and the route search server is a route search server which transmits to the terminal the data of the recommended route including the link data of the candidate route provided from the second route search server, on the basis of the recommended route determined by the recommended route determining means; and the terminal transmits to the route search server a route search request such that a point inside the serviceable area is the departure place and a point inside a different area outside of the serviceable area is the destination.

The invention according to a sixteenth aspect of the present application is the invention according to the fifteenth aspect, wherein based on the recommended route data received from the route search server, the terminal requests route guidance from the route search server when the terminal is located in the serviceable area of the route guidance system, and the terminal requests route guidance from the second route search server whose serviceable area is the different area when the terminal is located in the different area.

Effects of the Invention

The invention according to the first aspect is a route guidance system wherein first and second route guidance systems provided with country or region-specific map data and route search network data are linked and route guidance is provided. If the departure place and the destination are points in different areas, the first route guidance system extracts a candidate connection which is the border between the different areas, the first and second route guidance systems search for, respectively, an optimum route from the departure place to the candidate connection and an optimum candidate route from the candidate connection to the destination, the required times and link data thereof are provided to the respective route guidance systems, either the first or second route guidance system determines a recommended route having the shortest total required time from among the candidate routes combined at the candidate connection, recommended route data including link data is provided from the first route guidance system to the terminal, and the terminal requests route guidance from the first or second route guidance system depending on the area where the terminal is located on the basis of the recommended route data.

According to the route guidance system having this configuration, the route guidance systems whose serviceable areas are the respective areas both search for candidate routes leading to the candidate connection on the basis of point information of the candidate connection which is the border between the different areas; therefore, a route guidance system having only area-specific map data and route search network data can search for and provide guidance for an optimum route between a departure place and a destination leading to a different area.

Therefore, route guidance systems provided with country or region-specific map data and route search network data can be linked, and a series of route guidance services from the departure place to a destination in another country or region can be smoothly transferred from system to system.

The invention according to the second aspect is the invention according to the first aspect, wherein based on the candidate connection received from the first route search server and the required time of the candidate route, the candidate route combining means of the second route search server combines the required time of the candidate route searched by the first route search server with the required time of the candidate route from the candidate connection to the destination; and based on the required time of the combined candidate routes, the recommended route determining means of the second route search server designates the candidate route having the shortest required time as a recommended route, and provides the first route search server with data of the recommended route including link data of the candidate route from the candidate connection to the destination constituting the recommended route.

According to this configuration, since a recommended route having the shortest required time is determined from among optimum candidate routes from the departure place to the destination in the second route guidance system, the second route guidance system preferably provides only link data of the determined recommended route to the first route guidance system, and the quantity of data communication can be minimized.

The invention according to the third aspect is the invention according to the first aspect, wherein the candidate route combining means of the first route search server receives required times of candidate routes and link data from the second route search server, and combines the candidate route searched by the second route search server and the candidate route searched by the first route search server on the basis of the candidate connection; the recommended route determining means of the first route search server designates the candidate route having the least required time as a recommended route on the basis of the required times of the combined candidate routes; and recommended route data is transmitted to the terminal, the recommended route data including link data of the candidate route from the candidate connection to the destination constituting the recommended route.

According to this configuration, since a recommended route having the least required time is determined from among the optimum candidate routes from the departure place to the destination in the first route guidance system, the second route guidance system preferably provides only the required times and link data of the candidate routes to the first route guidance system, and the quantity of data communication can be minimized.

The invention according to the fourth aspect is the invention according to the second or third aspect, wherein the second route search server has candidate connection extracting means, and when a candidate connection that is different from the candidate connection transmitted from the first route search server is extracted on the basis of the point information of the destination, the point information of the different candidate connection is transmitted to the first route search server.

According to this configuration, in cases in which the second route guidance system is able to extract a candidate connection that the first route guidance system is unable to extract, it is possible to search for a candidate route that passes through this candidate connection.

The invention according to the fifth aspect is the invention according to the first aspect, wherein, based on the recommended route data received from the first route search server, the terminal requests route guidance from the first route search server when the terminal is located in the area to which the first route search server provides service, and the terminal requests route guidance from the second route search server whose serviceable area is the different area when the terminal is located in the different area.

According to this configuration, consequently, route guidance systems provided with country or region-specific map data and route search network data are linked, and a series of route guidance services from the departure place to a destination in another country or region can be smoothly transferred from system to system.

In the inventions according to the sixth through tenth aspects, the route guidance methods in the route guidance systems according to the first through fifth aspects can be provided. In the inventions according to the eleventh through fourteenth aspects, the route search servers constituting the route guidance systems according to the first through fourth aspects can be provided. In the inventions according to the fifteenth and sixteenth aspects, the terminals constituting the route guidance systems according to the first through fifth aspects can be provided.

DESCRIPTION OF SYMBOLS

Figure 1:
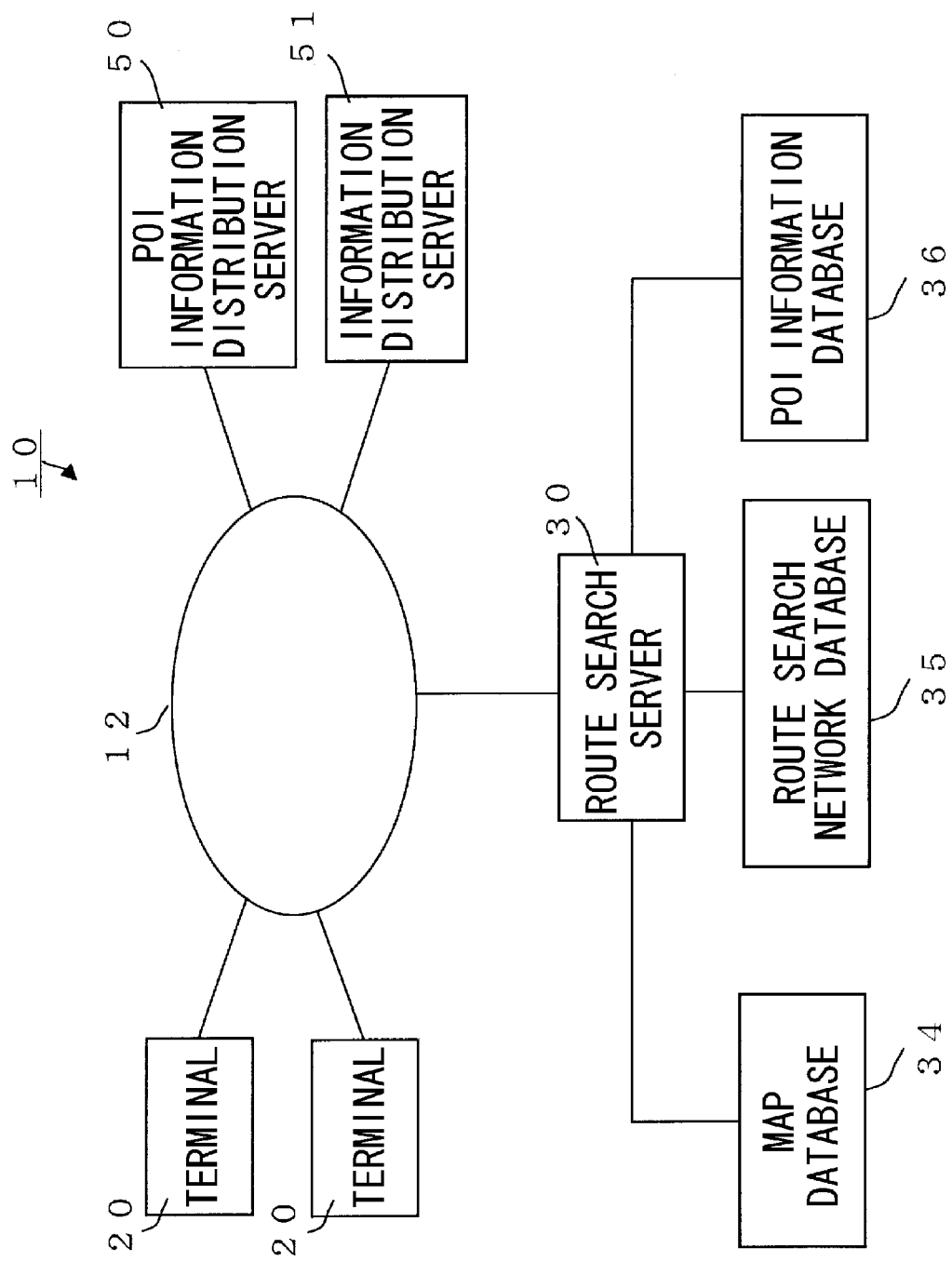
FIG. 1 is a system configuration diagram showing the configuration of a route guidance system 10 according to an example of the present invention.

10 Route guidance system
12 Network
20 Terminal
201 Control means
21 Communication means
22 GPS reception means
23 Search request means
24 Recommended route data storing means
25 Display means
26 Operation input means
27 POI retrieval means
28 Route guidance requesting means
30 Route search server
301 Control means
31 Communication means
32 Distribution data compiling means
33 Recommended route determining means
34 Map database
35 Route search network database
36 POI information database
37 Candidate connection/candidate route providing means
371 Candidate connection extracting means
372 Candidate route storing means
373 Candidate route combining means
38 Processing request storing means
39 Route searching means

BEST MODE FOR CARRYING OUT THE INVENTION

The present invention is described in detail hereinbelow using specific examples and drawings. The examples hereinbelow are intended to present examples of a route guidance system for specifying the technological concepts of the present invention and are not intended to limit the present invention to this route guidance system. The examples are equally applicable to other embodiments of a route guidance system included within the scope of the claims.

FIG. 1 is a system configuration diagram showing the configuration of a route guidance system 10 according to the present invention. The route guidance system 10 shown in FIG. 1 is comprises terminals 20 and a route search server 30 which are connected via a network 12. The route guidance system 10 is a system which designates specific countries and regions as areas for which route search and route guidance services will be provided. Therefore, the route search server 30 has only map data and route search network data covering the serviceable area.

The route guidance system 10 comprises a POI information distribution server 50 for providing the location, service specifics, and other detailed information of POIs (points of interest) belonging to various categories, various other information distribution servers 51 for providing contents such as music and various images as well as other information, and the like. The route search server 30 can acquire needed data from the POI information distribution server 50 and the other information distribution servers 51 via the network 12 and can add the data to its own database. The server can also similarly transmit a retrieval request to the POI information distribution server 50 or the other information distribution servers 51 and acquire the desired retrieval results.

The route guidance system 10 according to the present invention is not limited to the configuration described above; the route search server 30 may have a navigation service function as well as a map distribution server function for distributing maps of specific POI locations. A cellular telephone can also be used as a terminal 20, and other options include a PDA, a music player, a portable game device, and other portable devices; and a mobile personal computer (PC).

The route search server 30 shown in FIG. 1 comprises a map database 34 and a route search network database 35, and when a route search request comes from a terminal 20, the route search server 30 refers to the route search network database 35 and conducts a route search. The server also has a common navigation function for transmitting to the terminals 20 the guidance route data of an optimum route or a candidate route obtained from the route search results. When a request comes from a terminal 20 to retrieve a desired point or POI and acquire its map data, relevant map data is retrieved with reference to the map database 34, and the data is distributed to the terminal 20.

The route search network database 35 comprises road network data for searching for routes by walking or automobile, and a transportation network data for searching for routes for traveling by railroad, aircraft, boat, bus, or other transportation systems. The road network data designates the intersection points and nodal points of the roads as nodes and expresses the connections between nodes as links, and the times required when traveling at standard speeds are associated with the links as link costs.

The transportation network data designates line stations, airports, and harbors of transportation systems as nodes and expresses the connections between nodes as links, wherein the various transportation means including individual trains, aircraft, boats, buses, and the like constitute links, and the data is configured from data to which node departure times and node arrival times have been assigned based on operation time schedules.

In the terminals 20, route search conditions are designated which specify departure places, destinations, movement means (walking, automobile, transportation systems, and the like), departure times, and other time conditions, and when a route search request comes to the route search server 30, the route search server 30 refers to the network data of the route search network database 35 and searches for an optimum route or a plurality of candidate routes conforming to the route search conditions from the departure place to the destination, and then responds to the terminals 20 with information on the routes. When a route is selected and a route guidance request is issued in a terminal 20, map data, data on the selected route, and guidance data for providing guidance through the route are transmitted to the terminal 20.

In the present invention, different route guidance systems whose serviceable areas are different areas are linked to each other, and if the departure place and the destination are in areas where service is provided by different route guidance systems, an optimum route from the departure place to the destination can be searched and provided guidance as a recommended route.

Figure 2:
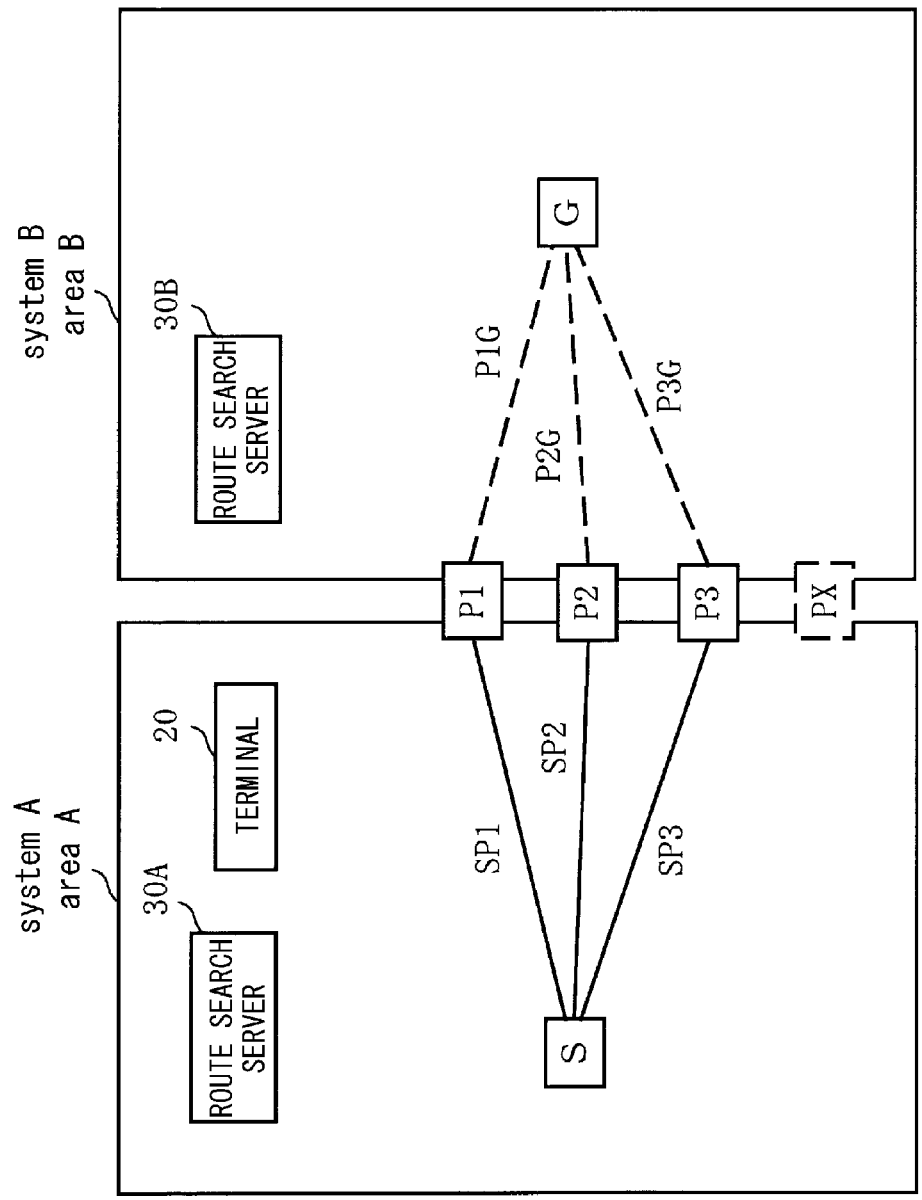
FIG. 2 is a system configuration diagram for describing a summary of route guidance service using a plurality of route guidance systems having different service areas according to an example of the present invention.

FIG. 2 is a system configuration diagram for describing a summary of route searching and route guidance of the present invention using this manner of system linking. In FIG. 2, system A is a route guidance system whose serviceable area is area A, and system B is a route guidance system whose serviceable area is area B, wherein system A and system B are systems having the same configuration as the route guidance system shown in FIG. 1.

The route search server 30A has only map data and route search network data covering area A, and the route search server 30B has only map data and route search network data covering area B. Therefore, the route search server 30A cannot search for routes in which the departure place or destination is a point within area B, and the route search server 30B cannot search for routes in which the departure place or destination is a point within area A.

In the present invention, when a terminal 20 sends to the route search server 30A of system A a route search request encompassing an area in which the departure place S is a point within area A and the destination G is a point within area B, system A and system B are linked in the following manner, and an optimum route from the departure place S to the destination G is determined as a recommended route and provided as guidance to the terminal 20.

In other words, when the destination G is a point outside of area A and within area B, the route search server 30A retrieves a link of movement means connecting between area A and area B, extracts one or more candidate connections P1 to P3, searches for optimum routes (routes having the minimum route costs) from the departure place S to the respective candidate connections P1, P2, P3, designates these routes as candidate routes SP1, SP2, SP3, and determines their required times (route costs).

The route search server 30A sends point information on the destination G, point information on the candidate points P1 to P3, and the required times for the candidate routes to the route search server 30B of system B, whose service area is area B where the destination G is located. The route search server 30B searches for optimum routes (routes having the minimum route costs) from the respective candidate points P1 to P3 to the destination G and searches for candidate routes P1G, P2G, P3G on the basis of the point information on the candidate points P1 to P3 and the point information on the destination G.

The route search server 30B combines (adds) the route costs (required times) of the candidate routes SP1, SP2, SP3 searched by the route search server 30A with the route costs (required times) of the candidate routes P1G, P2G, P3G within the candidate points P1 to P3, and determines that the recommended route is the optimum route whose route cost (total required time) from the departure place S to the destination G is the lowest. Assuming herein that the total route cost (required time) is the lowest for the candidate route SP2 and the candidate route P2G joined by the candidate connection P2, the route search server 30B transmits to the route search server 30A the point information on the candidate connection P2 and the route data (the total link data of the routes) of the candidate route P2G determined to be the recommended route. The data transmitted from the route search server 30B to the route search server 30A is data pertaining to the determined recommended route, and the amount of data communication can be minimized because the data of the other candidate routes is not transmitted.

The route search server 30A combines the point information on the candidate connection P2 received from the route search server 30B, the route data of the candidate route P2G determined as the recommended route (all link data of the route), and the route data of the candidate route SP2; specifies the departure place S, the candidate route SP2, the candidate connection P2, the candidate route P2G, and the recommended route for reaching the destination G; and responds with all of the route data to the terminal 20.

When the terminal 20 receives information on the recommended route from the route search server 30A, a request for route guidance is issued based on the recommended route to the route search server 30A within the range of area A. The route search server 30A provides to the terminal 20 guidance for the recommended route of a route section leading to the candidate connection P2 (the candidate route SP2), on the basis of the map data of area A.

When the terminal 20 reaches the candidate connection P2, since the terminal 20 has left area A and will enter area B, a request for route guidance service is issued to the route search server 30B. At this time, since route data (link data) on the recommended route (the candidate route P2G) from the candidate connection P2 to the destination G is stored in the terminal 20, this recommended route data is preferably transmitted to the route search server 30 and route guidance is preferably requested. Since the map data supplied to the terminal 20 in response to this route search request is carried by the route search server 30B whose service area is area B, and since map data is not taken outside of its area, restrictions relating to the carrying of map data remain valid.

When the route search server 30B has, based on the point information on the destination G received from the route search server 30A, extracted a candidate connection PX different from the candidate connections P1 to P3 extracted by the route search server 30A, point information on the candidate connection PX is sent to the route search server 30A, a request is issued for an additional search for an optimum candidate route from the departure place S to the candidate connection PX, the required time for the candidate route is acquired from the route search server 30A, and a final recommended route determination is preferably made in addition to the candidate route leading up to the other candidate connection, at the time of the recommended route in the route search server 30A.

Although the candidate connections shown in FIG. 2 are shown herein as specified points, area A and area B are adjacent on land, the candidate connections joining area A and area B together are points of the area border if the movement means is an automobile or a railroad, and a single point can be specified as the point information on the candidate connection as shown by P1 to P3 in FIG. 2, but this is not always the case.

For example, in cases in which the movement means between areas is a route that uses an aircraft or a route that uses a boat, two candidate points will be the node in area A and the node in area B that are the nodes at the ends of the link that joins the areas together and designates an aircraft or boat as the movement means. In cases in which the departure place S is in area A and the destination G is in area B, as is the case in FIG. 2, the point information on the candidate points sent from the route search server 30A in area A to the route search server 30B in area B indicates an airport which is the destination node of the aircraft link, and the point data on the candidate connections of the route search server 30A in area A indicates an airport which is the departure place node of the aircraft link. In this case, the total cost of the recommended route of course includes the required time of the aircraft link.

In the route search server 30A, in order to specify the destination G positioned within the range of area B provided with service by the route search server 30B, position information on the destination G must be specified in the route search server 30A. In this case, the configuration is preferably designed so that the route search server 30A does not need to have the map data of area B, and POI retrieval is conducted of the names of cities, prominent establishments, and the like within the range of area B to acquire the position information thereof. POI information can be acquired from the POI information distribution server 50 (see FIG. 1) and stored in the POI information database 36.

Information on airports, harbors, and the like, which are primary establishments, is included as POI information of areas outside of area A or outside of the country in the POI information database 36 of the route search server 30A, and the route search server 30 can therefore extract airports and harbors in the vicinity of the designated destination G as candidate connections.

When system A and system B are both providing services to a user and user authentication is required, the user of the terminal 20 must enter a user registration, a user authentication, a terminal registration, and the like into the route search server 30A and the route search server 30B of system A and system B. If system A and system B are systems that provide route guidance service to numerous unspecified users, registration and authentication are not required.

Figure 3:
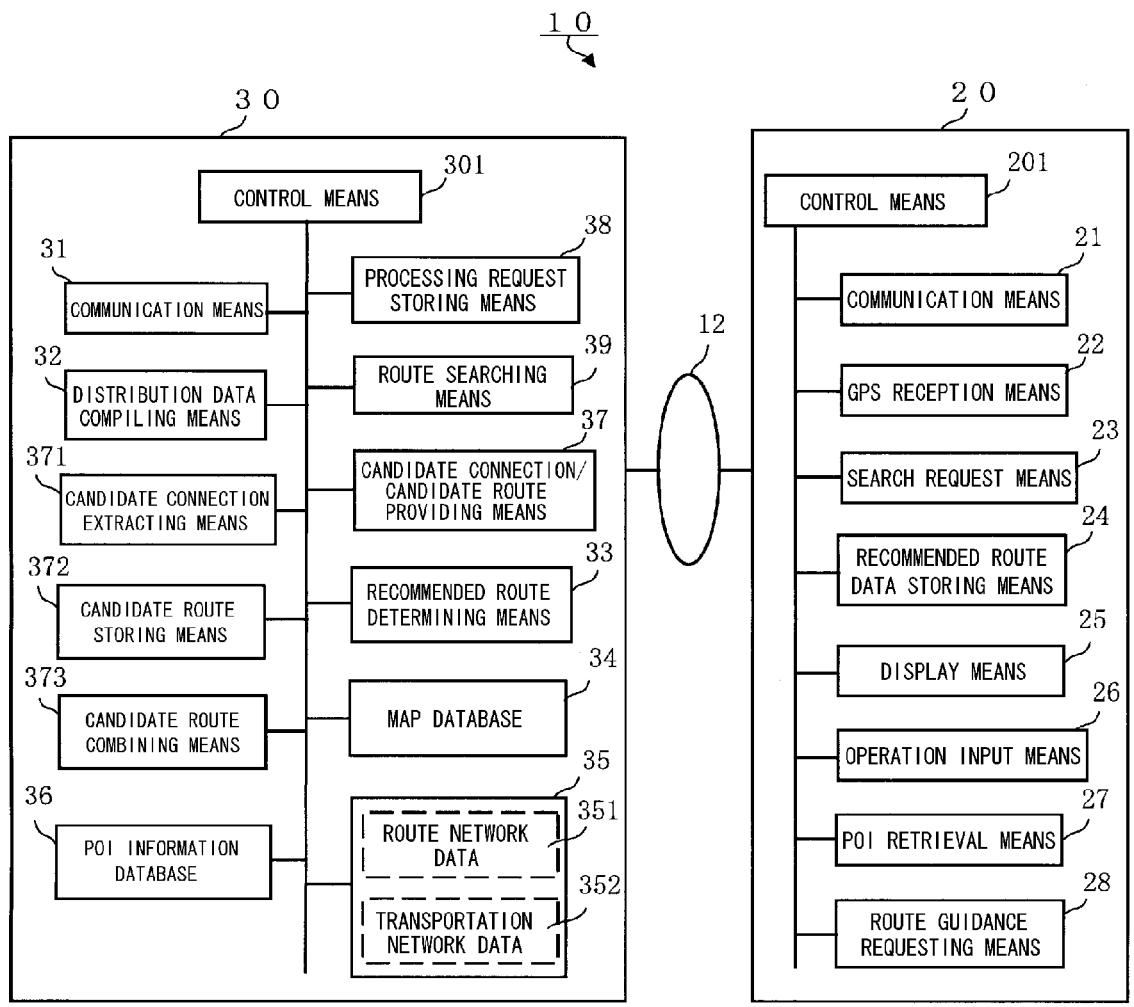
FIG. 3 is a block diagram showing the detailed configuration of a route guidance system according to an example of the present invention.

A route guidance system 10 according to an example of the present invention is described hereinbelow based on specific examples, but first the detailed configuration of the route guidance system 10 according to the present invention will be described. FIG. 3 is a block diagram showing the detailed configuration of a route guidance system of system A or system B (see FIG. 2) whose serviceable areas are certain specific areas.

The terminal 20 is a terminal which can receive navigation service, and is configured comprising control means 201, communication means 21, GPS reception means 22, search request means 23, recommended route data storing means 24, display means 25, operation input means 26, POI retrieval means 27, route guidance requesting means 28, and other components. The operation input means 26 is configured from character input keys, selection keys, cursor keys for selecting setting items and the like on a menu screen displayed on a display screen, and other components.

As previously described, the route search server 30 comprises a map database 34 which stores map data, a route search network database 35 which stores road network data 351 and transportation network data 352 for route searches, and a POI information database 36 for storing the names and position information of POIs. In cases in which the route search server 30 has a function for searching for a route using walking or public transportation systems and providing guidance to the terminal 20, a search for a route is performed using the road network data 351 and the transportation network data 352 stored in the route search network database 35.

The route search server 30 is configured comprising control means 301, communication means 31, distribution data compiling means 32, recommended route determining means 33, the map database 34, the route search network database 35, the POI information database 36, candidate connection/candidate route providing means 37, candidate connection extracting means 371, candidate route storing means 372, candidate route combining means 373, processing request storing means 38, route searching means 39, and other components.

When the route search server 30 receives a request for a route search, a POI retrieval, or a map distribution from the terminal 20, the route search server 30 temporarily stores the request in the processing request storing means 38. In the case that the request is a route search request, the route searching means 39 refers to the route search network database 35 and searches for an optimum route or a recommended route (guidance route). Data on the searched guidance route is compiled in the distribution data relating to the terminal 20 by the distribution data compiling means 32 and is distributed to the terminal 20. Map data including the guidance route is read from the map database 34 and distributed to the terminal 20.

When the route search server 30 receives a route search request from the terminal 20, the route search server 30 temporarily stores the request in the processing request storing means 38. The route searching means 39 refers to the route search network database 35 and searches for a plurality of candidate routes from the departure place to the destination in accordance with the route search conditions included in the route search request stored in the processing request storing means 38.

In cases in which the route search request is a request for a normal route search, i.e., the departure place and the destination are points within the serviceable area of the route search server 30, the route searching means 39 refers to the route search network database 35 to perform a normal route search, searches for an optimum route or a plurality of candidate routes in accordance with the route search condition settings, and provides the results of the search to the terminal 20. Data on the optimum route, candidate routes, or other guidance routes obtained as a result is transmitted to the terminal 20 along with the map data read from the map database 34. This route search method is the same method as that of a route search server in normal navigation systems.

In a route search request from the terminal 20, in cases in which the departure place is within the service area of the route search server 30 as is the departure place S of FIG. 2 and the destination is a point outside of the serviceable area of the route search server 30 as is the destination G, for example, the route search and the guidance for the optimum recommended route are provided as was described with reference to FIG. 2.

That is, the candidate connection extracting means 371 extracts one or more candidate connections (for example, P1 to P3 in FIG. 2) joining the area where the departure place S (see FIG. 2) is located, on the basis of the area where the designated destination G (see FIG. 2) is located. When the candidate connections are extracted, the route searching means 39 searches for optimum routes connecting the departure place S and the candidate connections (P1 to P3) together and designates these routes as candidate routes (SP1 to SP3 in FIG. 2), and data and required times (link costs) of the respective candidate routes are stored in the candidate route storing means 372.

When the candidate route searches are complete, the candidate connection/candidate route providing means 37 sends the point information (position information) of the candidate connections (P1 to P3) and the required times of the candidate routes to the route search server 30 whose serviceable area is the area where the destination G is located (see 30B in FIG. 2), and requests a search for candidate routes from the candidate connections to the destination G.

When the route search server 30 (30B in FIG. 2) receives the point information of the destination G, the point information of the candidate connections (P1 to P3), and the required time information of the candidate routes (SP1 to SP3) from the departure place S to the candidate connections, the route searching means 39 searches for optimum routes from the candidate connections (P1 to P3) to the destination G and designates these routes as candidate routes (P1G to P3G). The candidate route combining means 373 adds the required time information of the candidate routes SP1 to SP3 respectively to the candidate routes (P1G to P3G), calculates the total required time (link cost) from the departure place S to the destination G, and combines the candidate routes. The recommended route determining means 33 performs a cost comparison of the candidate routes combined by the candidate route combining means 373, determines the candidate route having the lowest cost to be the recommended route, and sends the link data and candidate connections of the recommended route to the route search server 30 that had originally made the request (30A in FIG. 2).

When the terminal 20 receives the recommended route information from the route search server 30 (30A in FIG. 2), a request for route guidance is issued based on the recommended route to the route search server 30A within the range of area A. The route search server 30A provides guidance for the recommended route, pertaining to route sections leading to the candidate connections, to the terminal 20 on the basis of the map data of area A.

When the terminal 20 reaches a candidate connection, the terminal 20 leaves the serviceable area (area A) and enters the other serviceable area (area B), and a request for route guidance service is therefore issued to the route search server 30 (30B in FIG. 2). At this time, since route data (link data) of the recommended route from the candidate connection to the destination G is stored in the terminal 20, data of this recommended route is transmitted to the route search server 30 (30B in FIG. 2), and route guidance is preferably requested.

Herein is described a common method of searching for routes including movement routes that use transportation systems. Stored in the route search network database 35 are the road network data 351 for searching for movement routes that use walking or automobiles, and the transportation network data 352 for searching for movement routes that use public transportation systems. The route searching means 39 refers to the route search network database 35 and searches for a route that uses walking or automobiles or a route that uses both walking and transportation systems.

The road network data 351 is configured as follows. For example, in a case in which the road consists of roads A, B, and C as shown in FIG. 4, the end points, intersection points, turning points, and other such features of the roads A, B, and C are designated as nodes, the roads connecting the nodes together are represented as links having direction, and the road is configured from node data (latitude and longitude of nodes), link data (link numbers), and link costs data in which the data is the link cost of the links (the link distance or the required time needed in order to travel the links).

Figure 4:
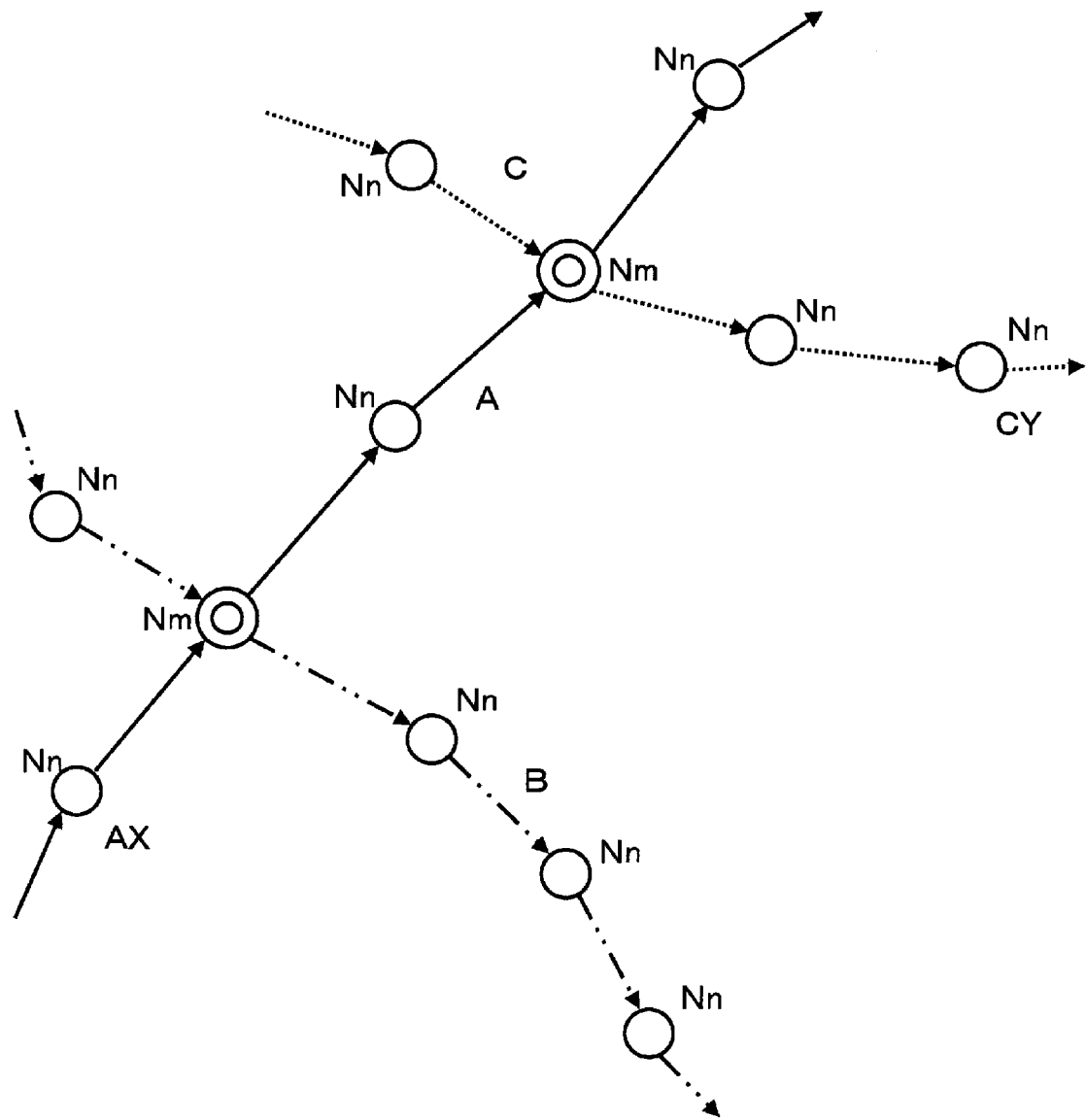
FIG. 4 is a schematic drawing showing an outline of the data of a road network.

That is, in FIG. 4, the letters Nn (the symbol ○) and Nm (the symbol ⊙) indicate nodes, and Nm (the symbol ⊙) indicates an intersection point between roads. Links having direction and connecting nodes together are shown as arrow lines (solid lines, dotted lines, and double-dotted lines). Among links, there are links which indicate upward and downward sloping of roads, but for the sake of simplifying the drawing in FIG. 4, only links of arrow directions are shown.

In cases in which a route search is performed using this manner of road network data as a route search database, the links connecting from the departure place node to the destination node are traversed, their link costs are totaled, the route having the smallest total link cost is searched, and guidance is provided. Specifically, in a case in which the departure place is the node AX and the destination is the node CY in FIG. 4 and a route search is performed, road A is traveled from node AX, a right turn is made at the second intersection point onto road C, the links leading to node CY are traversed in sequence, the link costs are totaled, the route having the smallest total value of link costs is searched, and guidance is provided.

No other routes leading from node AX to node CY are shown in FIG. 4, but since other such routes actually do exist, multiple routes whereby node CY can be reached by node AX are similarly searched, and of these routes, the route having the smallest link cost is determined to be the optimum route. This method is performed by a conventional method known as the Dijkstra method, for example.

Figure 5:
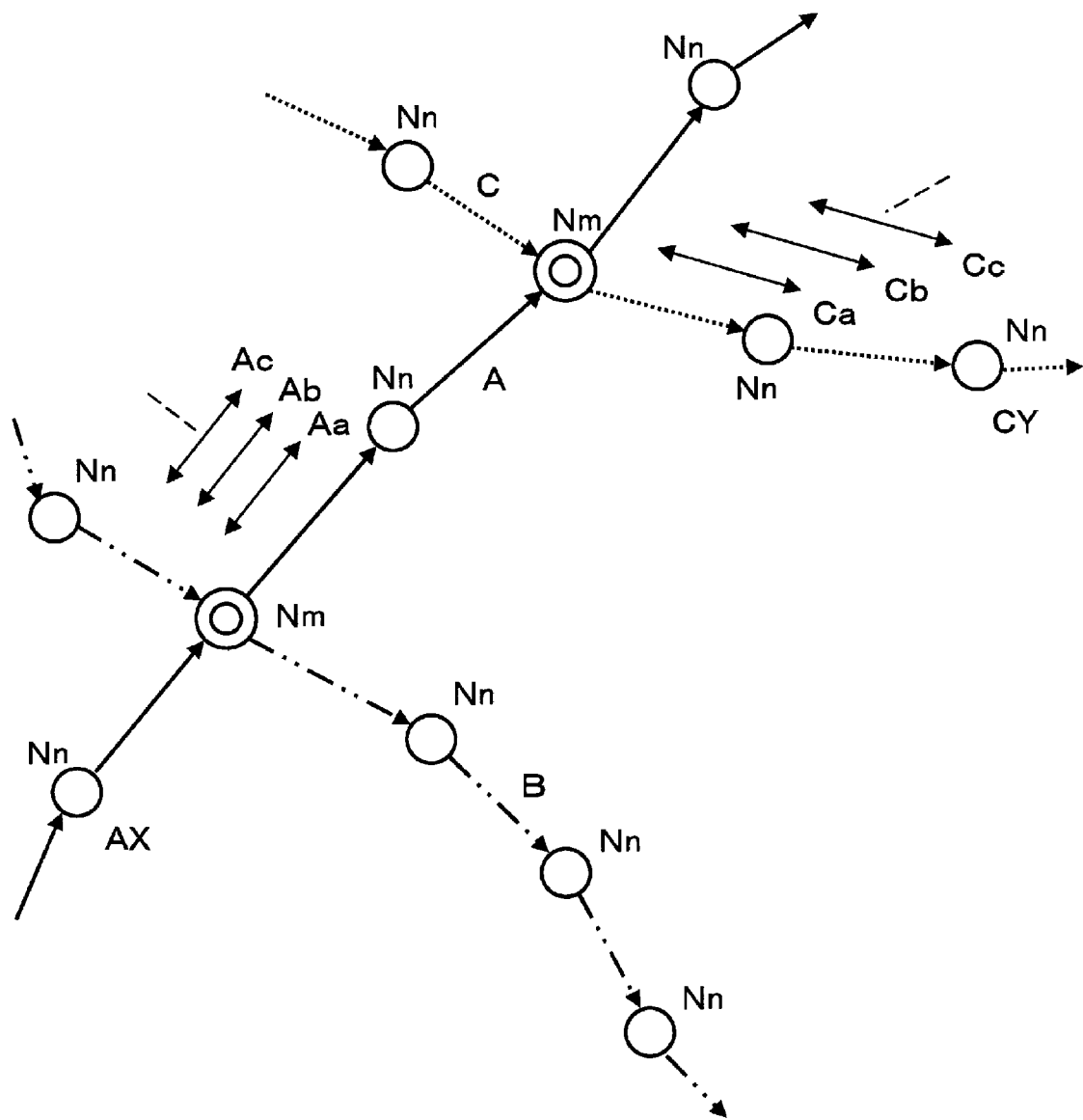
FIG. 5 is a schematic drawing showing an outline of the data of a transportation network.

The transportation network data 352 for conducting a route search of transportation systems is configured as follows. For example, in a case of the transportation lines A, B, and C such as is shown in FIG. 5, the stations provided at the transportation lines A, B, and C (airports in lines of aircraft) are designated as nodes, the sections joining the nodes together are represented as links having direction, and node data (latitude and longitude) and link data (link numbers) are designated as network data. In FIG. 5, the letters Nn (the symbol ○) and Nm (the symbol ⊙) indicate nodes, where Nm (the symbol ⊙) indicates a connection point (a transfer station or the like) of a transportation line, and links having direction and connecting nodes together are indicated by arrow lines (solid lines, dotted lines, and double-dotted lines). Among links, there are links which indicate upward and downward sloping of roads, but for the sake of simplifying the drawing in FIG. 5, only links of arrow directions are shown.

However, the link costs of a transportation network are fundamentally different from those of a road network. That is, link costs in a road network have been fixed and static, whereas in a transportation network, there are numerous trains and aircraft traveling the transportation lines as shown in FIG. 5 (the routes of individual trains, aircraft, and the like are hereinbelow referred to as "transportation means"). There are cases in which the departure time from a node and the arrival time at the next node are established for each transportation means (defined as time schedule data and operation data) and individual routes are not necessarily linked at adjacent nodes. For example, there are cases such as express trains and local trains. In such cases, a plurality of different links exist on the same transportation line, and there are cases in which the required times between nodes differ depending on the transportation means.

In the transportation network shown in FIG. 5, there is a plurality of transportation means (routes) Aa to Ac . . . on the same link of the transportation line A, and a plurality of transportation means (routes) Ca to Cc . . . on the transportation line C. Therefore, in an operation network of a transportation system, unlike a simple road network, the quantity of data including nodes, links, and link costs is proportionate to the total number of transportation means (routes of individual aircrafts, trains, and the like). Therefore, the quantity of data of a transportation network is much greater than the quantity of data of a road network.

To search for a route from a certain departure place to a certain destination using this manner of transportation network data, all of the transportation means which can be used (ridden) to reach the destination from the departure place must be searched and a transportation means that conforms to the search conditions must be specified.

For example, in FIG. 5, in a case in which a route search is performed wherein a specified departure time is designated with the node AX of the transportation line A as the departure place and the node CY of the transportation line C as the destination, all of the transportation means that depart at or after the departure time from among the transportation means Aa to Ac . . . operating on the transportation line A are selected in sequence as routes at the time of departure. Based on the arrival time at the connection node on the transportation line C, a search is conducted of a combination of all the transportation means from the arrival time onward which can be boarded at the connection node from among the transportation means Ca to Cc . . . operating on the transportation line C, the required times, number of boardings, and other parameters of the routes are totaled, and guidance is provided.

Using this manner of network data, the route search server 30 searches a plurality of candidate routes from the departure place to the destination in accordance with the route search conditions and sends the result as guidance route data to the terminal 20. If the departure time from the departure place is specified in the route search conditions, the arrival time at the destination is included in the guidance route data, or if the arrival time at the destination is specified, the departure time from the departure place for arriving at the destination at the specified time is included, and the terminal 20 can display this data together with the details of the route on the display means 25. In cases in which a transfer station is included in the guidance route, the train to be boarded at the transfer station and the departure time of the train can similarly be displayed.

Figure 6:
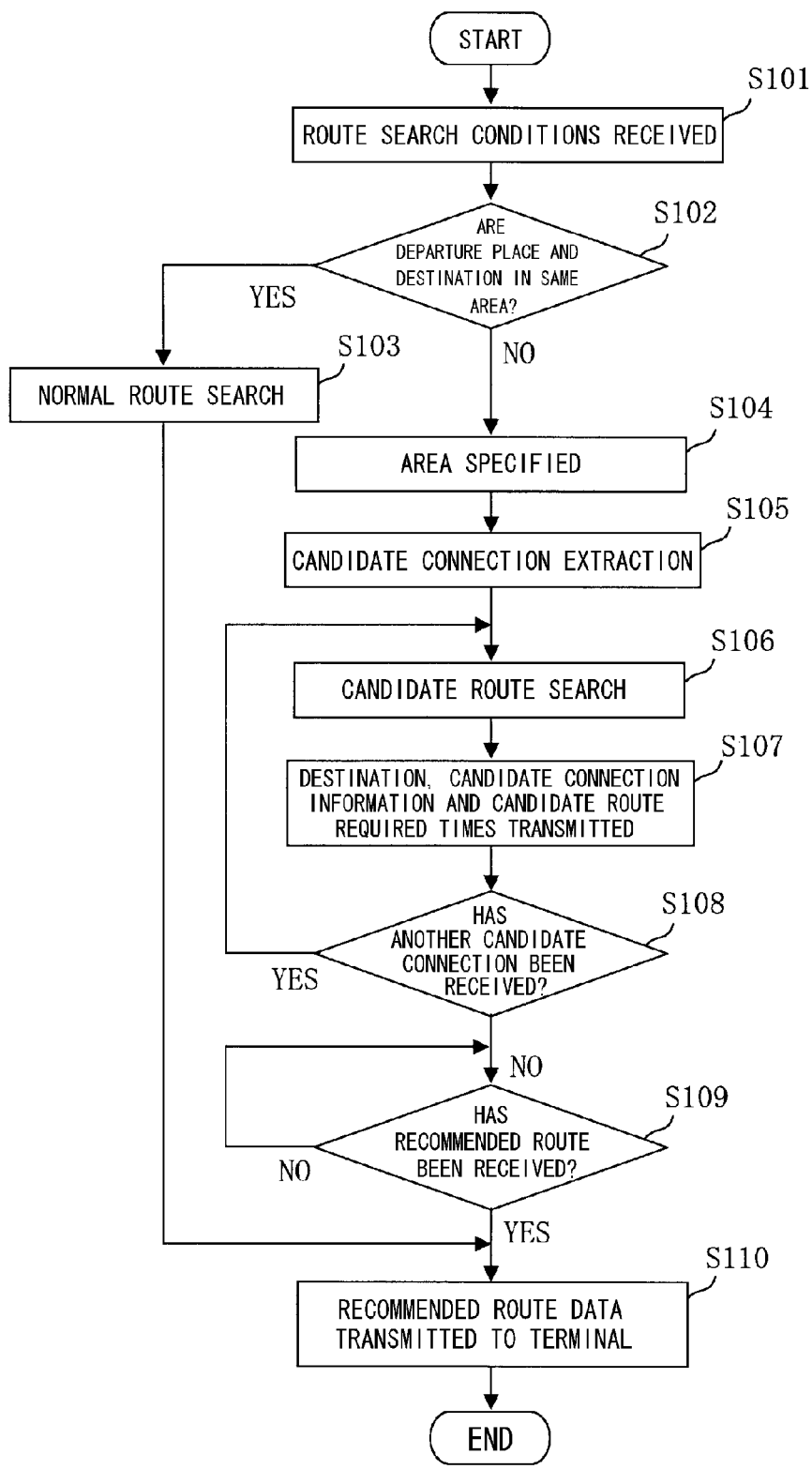
FIG. 6 is a flowchart showing the operation sequence of the route search server of one system shown in FIG. 2.

Next, the operation sequence of the route guidance system according to the example of the present invention will be described in detail with reference to the flowcharts shown in FIGS. 6 and 7. FIG. 6 is a flowchart showing the operation sequence of the route search server 30A of one system A shown in FIG. 2, and FIG. 7 is a flowchart showing the operation sequence of the route search server 30B of the other system B shown in FIG. 2.

Figure 7:
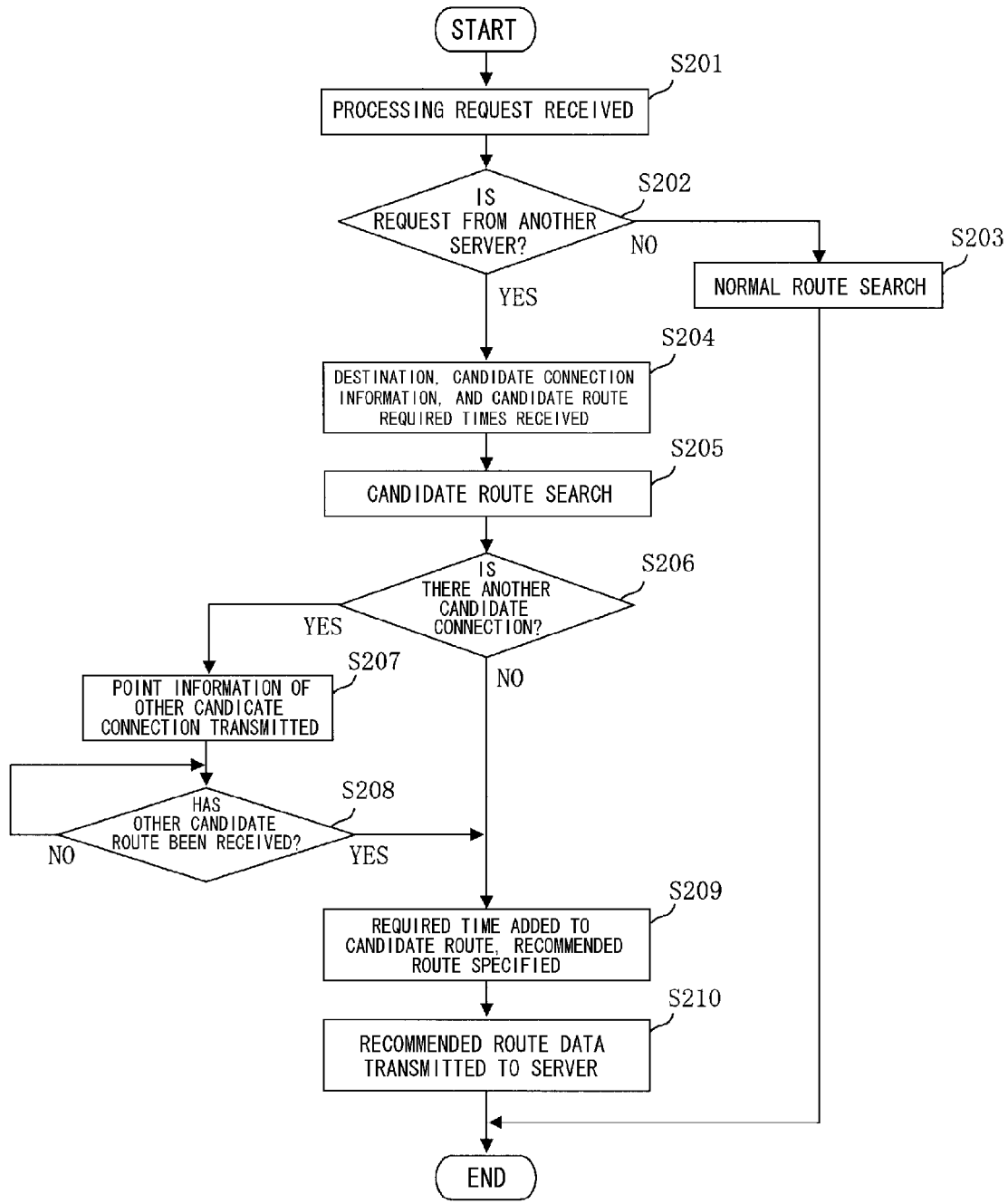
FIG. 7 is a flowchart showing the operation sequence of the route search server of the other system shown in FIG. 2.

In the present invention, in a case in which the route search server 30A of system A receives from the terminal 20 a cross-area route search request in which the departure place S is a point within area A and the destination G is a point within area B, system A and system B are linked, an optimum route from the departure place S to the destination G is determined as a recommended route, and guidance is provided to the terminal 20, according to the sequences shown in the flowcharts shown in FIGS. 6 and 7.

The terminal 20 designates route search conditions including the departure place and the destination and sends a route search request to the route search server 30 of system A.

First, in the process of step S101, the route search server 30A receives the route search request, a route guidance request, or another processing request from the terminal 20, and also receives the route search conditions included in the processing request.

The route search server 30A distinguishes in the process of step S102 the areas where the departure place S and the destination G are located, which were specified in the route search conditions received from the terminal 20. If both the departure place S and the destination G are located within the range of area A where system A provides service (YES in step S102), the route searching means 39 refers to the route search network database 35, performs a normal route search, transmits a recommended route to the terminal 20 in the process of step S110, and ends the process.

In the area-distinguishing process of step S102, if it is determined that either the departure place or the destination is not within the range of area A (NO in step S102), the route search server 30A specifies the area in the process of step S104. If the departure place and destination place are in the same area, then a normal route search occurs as shown in S103. The following description is made on the premise that the destination G is located in area B where service is provided by system B (the route search server 30B), as shown in FIG. 2.

That is, in step S104, the route search server 30A specifies that the destination G is a point outside of area A and inside area B. When the area is specified, the route search server 30A retrieves links of movement means connecting area A and area B, and in step S105, the candidate connection extracting means 371 extracts one or more candidate connections (for example, P1 to P3). When the candidate connections (P1 to P3) are extracted, in the process of step S106, the route searching means 39 searches for optimum routes (routes having the lowest route costs) from the departure place S to the respective candidate connections P1, P2, and P3, designates these routes as candidate routes SP1, SP2, and SP3, and determines their required times (route costs).

When the candidate route search is complete, the route search server 30A advances to the process of step S107, the route search server 30A sends point information of the destination G, point information of the candidate connections P1 to P3, and the required times of the candidate routes to the route search server 30B of system B whose service area is area B where the destination G is located, and a route search process is requested. The process of the route search server 30B upon receiving this information is described hereinafter with reference to FIG. 7.

Next, the process advances to step S108, and the route search server 30A makes a determination as to whether or not a notification of another candidate connection has been received from the route search server 30B. If no point information of any other candidate connections has been received from the route search server 30B, the route search server 30A advances to the process of step S109 and waits to receive a recommended route from the route search server 30B.

When point information of another candidate connection is received from the route search server 30B, the process returns to step S106, and the route searching means 39 searches for the optimum route from the departure place S to the other candidate connection on the basis of the other candidate connection information received from the route search server 30B, designates this route as a candidate route, and calculates the required time. In the process of step S107, data of the candidate connection and the required time of the candidate route is then transmitted to the route search server 30B, similar to the process described previously.

When the route search server 30A receives the recommended route information (data including the route link data) from the route search server 30B in the process of step S109, the route search server 30A advances to the process of step S110 and transmits data of the recommended route for reaching the destination G from the departure place S to the terminal 20. Based on the recommended route data received from the route search server 30A, the terminal 20 sends a request for route guidance to the route search server 30A when located within the range of area A or to the route search server 30B if the terminal has arrived in the range of area B.

When the route search server 30B receives a processing request in step S201 as shown in the flowchart in FIG. 7, the route search server 30B makes a determination in the determination process of step S202 as to whether or not the request is from another route search server, which in this case is the route search server 30A whose serviceable area is area A. If the processing request is not from another route search server, a normal route search is performed in the process of step S203, and the process is complete.

In the case that the processing request is from the other route search server 30A, in the process of step S204, the route search server 30B receives information on the destination and the candidate connections as well as the required times of the candidate routes within area A searched by the route search server 30A. Next in the process of step S205, in the route search server 30B, the route searching means 39 (see FIG. 3) searches for an optimum route from the candidate connections (P1 to P3) to the destination G and designates candidate routes (P1G to P3G).

In the process of step S206, the route search server 30B refers to the POI information and other parameters within area B, and conducts a retrieval on whether or not there are any other candidate connections in addition to the candidate connections received from the route search server 30A. If another candidate connection is retrieved, the process advances to step S207 where information of the other candidate connection is transmitted to the route search server 30A, and in the process of step S208, server waits to receive a candidate route (a candidate route from the departure place S to the other candidate connection) from the route search server 30A.

When it is determined in step S206 that there is no other candidate connection, the route search server 30B advances to the process of step S209, adds the required times of the candidate routes (route costs) to the candidate connections received from the route search server 30A to the candidate routes from the candidate connection to the destination G it searched for itself, and determines as a recommended route the route having the least possible total required time from the departure place S to the destination G. This process is performed by the candidate route combining means 373 (see FIG. 3) and the recommended route determining means 33 (see FIG. 3).

When the recommended route is determined in the process in step S209, the route search server 30B transmits information of the determined recommended route and information of the candidate connections to the route search server 30A, as shown in step S210. The recommended route information includes the candidate routes within the range of area B searched by the route search server 30B, i.e., link data of the routes from the candidate connections to the destination G.

When the route search server 30A receives candidate connection information and recommended route information (including link data) from the route search server 30B, the route search server 30A combines the recommended route information received from the route search server 30B with information of the routes leading to the candidate connections from the departure place S in the range of area A searched for by the route search server 30A itself, and the route search server 30A can transmit this information to the terminal 20 as information of a recommended route from the departure place S to the destination G.

Figure 8:
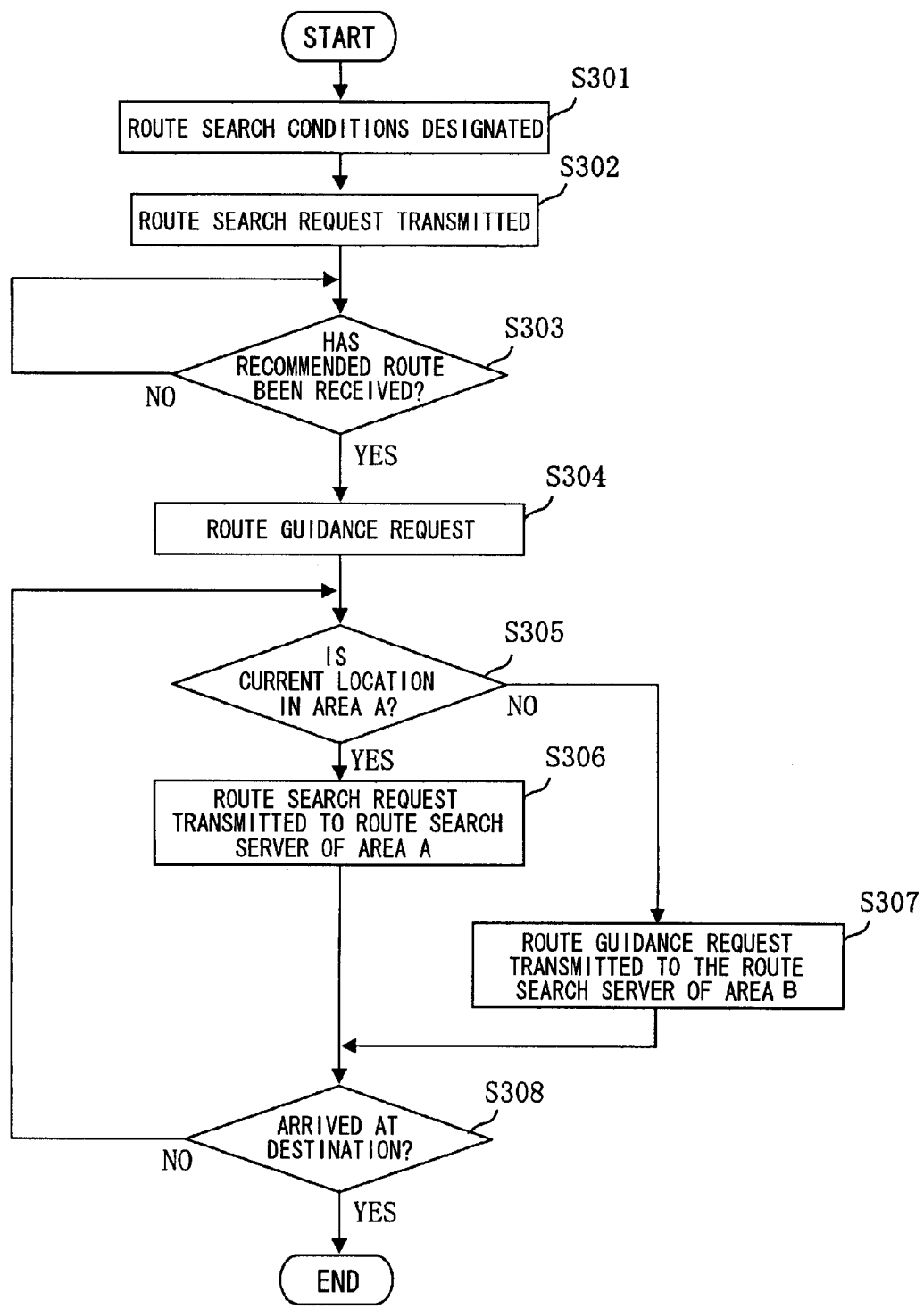
FIG. 8 is a flowchart showing the operation sequence of the terminal shown in FIG. 2.

Next, the operation sequence of the terminal 20 in FIG. 2 will be described with reference to the flowchart shown in FIG. 8. The flowchart shown in FIG. 8 shows the sequence of a case in which the terminal 20 transmits a route search request to the route search server 30A whose serviceable area is area A shown in FIG. 2, wherein the departure place S and the destination G (within the range of area B) are the route search conditions.

In the process of step S301, the terminal 20 designates the departure place S and the destination G (within the range of area B) as route search conditions. When designating the destination G, the terminal 20 may designate a name or the like to the destination and send a POI retrieval request to the route search server 30A as necessary, and may also acquire the point information (position information) thereof; or the terminal 20 may designate the point name alone of the destination G as a route search condition and the route search server 30A may acquire the point information of the destination G from the route search condition.

Next, advancing to the process of step S302, the terminal 20 transmits to the route search server 30A a route search request including information of the designated route search conditions. In the process of step S303, a determination is made as to whether or not the recommended route data has been received from the route search server 30A. If it has not been possible to receive the recommended route data, the process of step S303 is repeated, and when the recommended route data is received, the process advances to step S304, where a request for route guidance is issued by the route guidance requesting means 28 when the user requests route guidance on the basis of the recommended route.

When a request for route guidance is sent, the GPS reception means 22 of the terminal 20 detects the current location of the terminal 20 itself, and a determination is made in step S305 as to whether or not the current location is within the range of area A. If the current location is within the range of area A, the process advances to step S306, and a request for route guidance is transmitted to the route search server 30A.

If the current location is not within the range of area A, the process advances to step S307, and the request for route guidance is transmitted to the route search server 30B. In cases in which an authentication request for the terminal 20 is made in the route search server 30B, the terminal 20 transmits a user ID, a password for authentication, and other data from the operation input means 26 to the route search server 30B.

In the process of step S308, a determination is made as to whether or not the terminal 20 has arrived in the destination, and if it has not arrived in the destination, the process returns to step S305. When the terminal is determined to have arrived at the destination, the terminal 20 ends the processing.

At the point in time of the route guidance request made to the route search server 30B in step S307, the terminal 20 is outside of area A and inside area B, but since route data (link data) of the recommended route from the candidate connection to the destination G is stored in the terminal 20, this recommended route data is preferably transmitted to the route search server 30 and route guidance is then preferably requested. Since the map data provided to the terminal 20 in response to this route guidance request is carried by the route search server 30 whose service area is area B, the map data is not provided outside of the area.

In the above description of the example, a specific example is made of a case in which a route search is requested of the route search server 30B of system B by the route search server 30A of system A, i.e., a case in which a request is issued for a route search from area A to area B. The same applies to a case in which a route search request is issued from the route search server 30B of system B to the route search server 30A of system A, i.e., a case in which a request is issued for a route search from area B to area A.

In the above description, a configuration was used in which a recommended route is determined in the route search server 30B of area B for the route search request from the route search server 30A of area A, and the link data of the candidate routes in area B constituting the recommended route is send to the route search server 30A of area A; however, the configuration can also be designed such that the recommended route is determined in the route search server 30A.

In this case, the configuration is preferably designed so that the required times and link data of the candidate routes leading to the destination from the candidate connections P1 to P3 searched by the route search server 30B are transmitted from the route search server 30B to the route search server 30A, the candidate routes SP1, SP2, and SP3 searched by the route search server 30A are combined, and the recommended route is determined by the route search server 30A. Since the data of the candidate routes searched by the route search server 30B is already sent to the route search server 30A, the route search server 30A can combine the link data of the entire recommended route.

If this is the case, when the route search server 30B has, based on the point information of the destination G received from the route search server 30A, extracted a candidate connection PX different from the candidate connections P1 to P3 extracted by the route search server 30A, the route search server 30B then searches for an optimum candidate route from the candidate connection PX to the data of the other candidate routes P1G to P3G, and sends the route data and required time to the candidate connection PX along with the point information of the candidate connection PX to the route search server 30A. The route search server 30A can search for an optimum route from the departure place S to the candidate connection PX on the basis of the received point information of the candidate connection PX, add this route to the candidate routes SP1 to SP3, and determined a recommended route.

Figure 9:
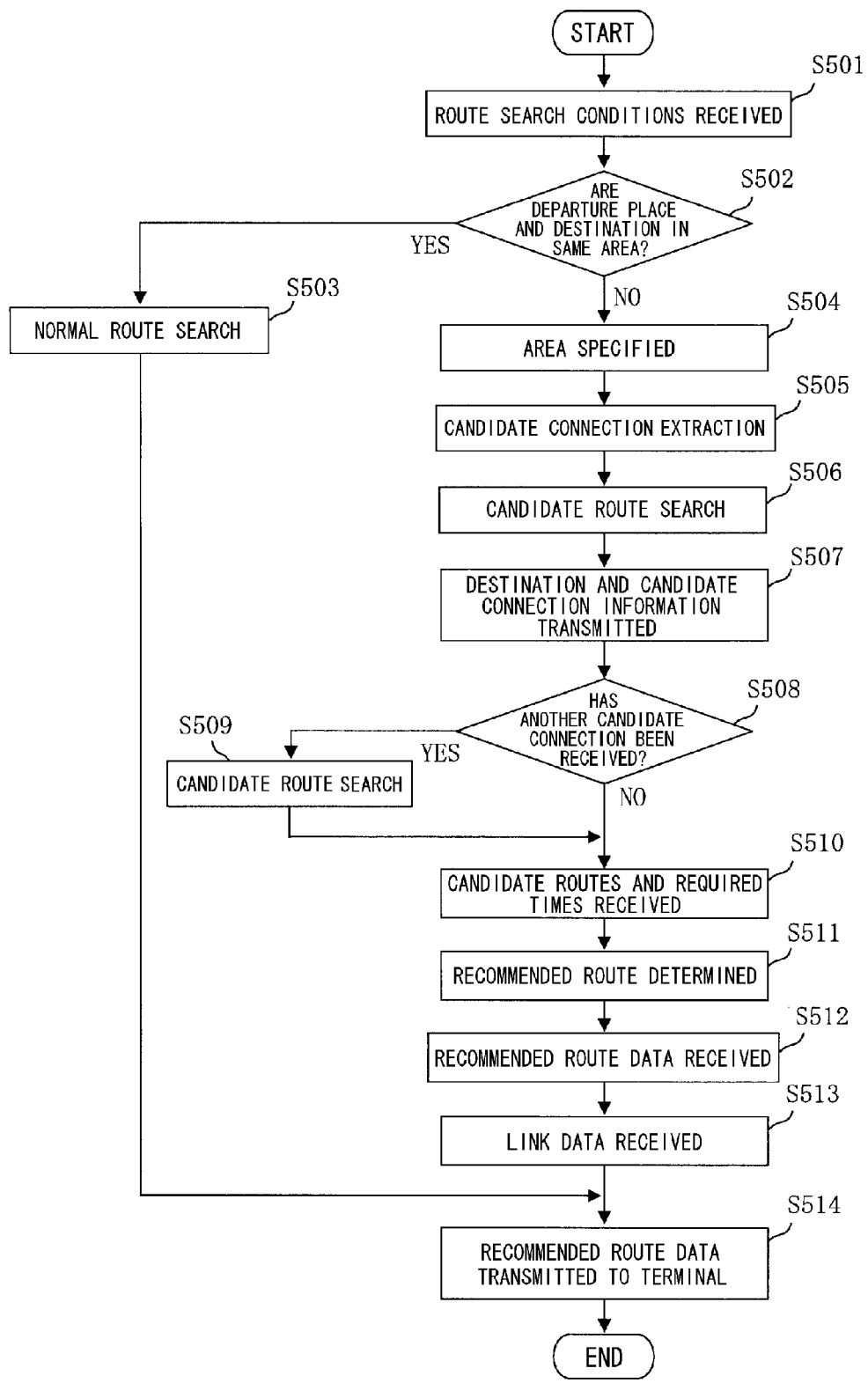
FIG. 9 is a flowchart showing the operation sequence of the one route search server in a case in which the recommended route determination is performed by one route search server.
Figure 10:
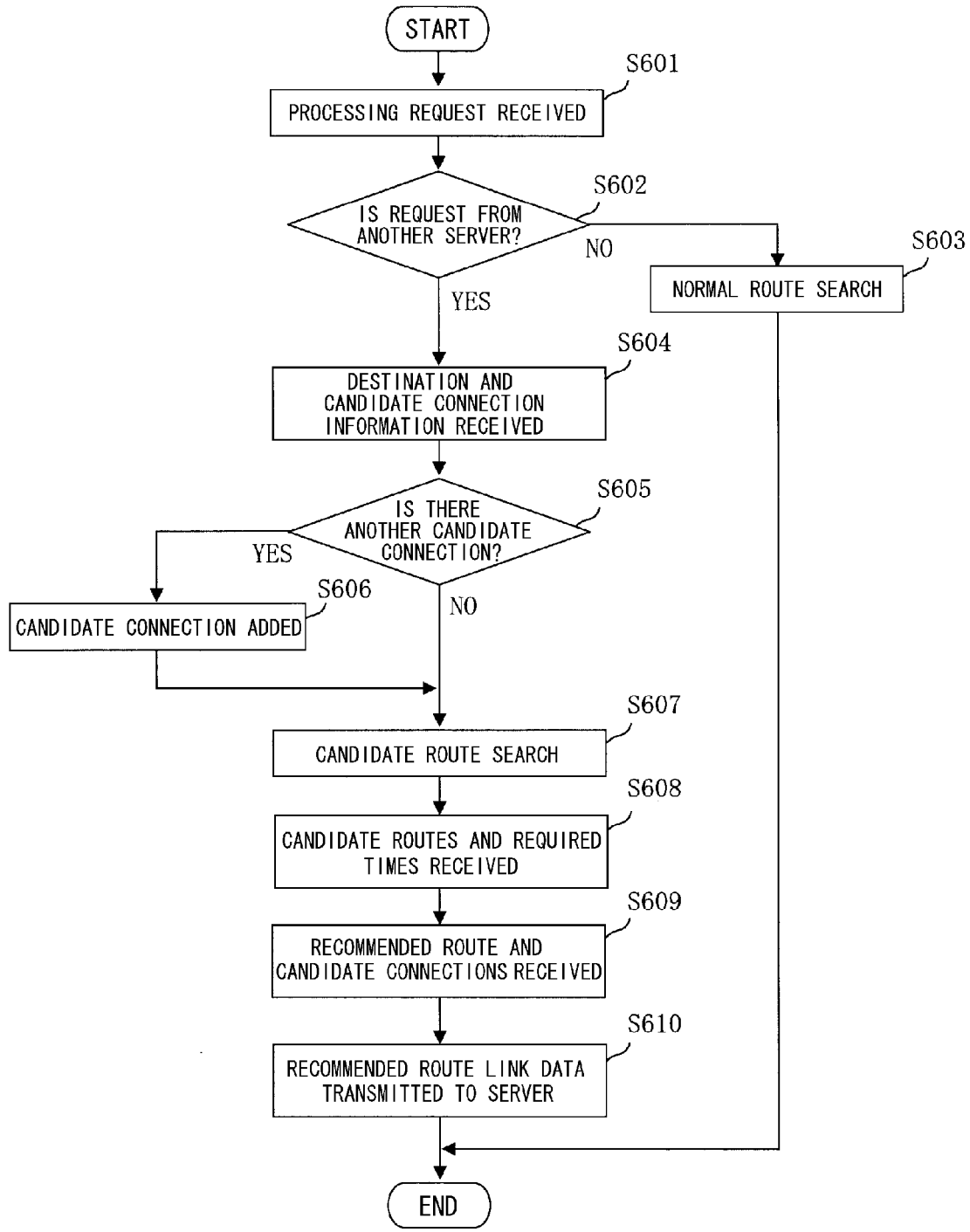
FIG. 10 is a flowchart showing the operation sequence of the other route search server in a case in which the recommended route determination is performed by one route search server.

An operation sequence is described in the case of a configuration in which the route search server 30A of the route guidance system A determines the recommended route. FIG. 9 is a flowchart showing the operation sequence of the route search server 30A, and FIG. 10 is a flowchart showing the operation sequence of the route search server 30B. The operation sequence of the terminal 20 is the same as the sequence shown in the flowchart of FIG. 8.

In FIG. 9, the process from step S501 to step S506 is the same process as the process from step S101 to step S106 in FIG. 6. In the process of step S506, the route searching means 39 searches for the optimum routes (the routes having the smallest route costs) from the departure place S to each of the candidate connections P1, P2, and P3, designates these routes as candidate routes SP1, SP2, and SP3, and determines their required times (route costs).

When the candidate route search is complete, the route search server 30A advances to the process of step S507, the route search server 30A sends point information of the destination G and point information of the candidate connections P1 to P3 to the route search server 30B of the route guidance system B, and a request is issued for the route search process. The process of the route search server 30B upon receiving this information is described hereinafter with reference to FIG. 10.

Next, the process advances to step S508, and the route search server 30A makes a determination as to whether or not a notification of another candidate connection has been received from the route search server 30B. If no point information of any other candidate connections has been received from the route search server 30B, the route search server 30A advances to the process of step S510 and waits to receive a recommended route from the route search server 30B.

When point information of another candidate connection is received from the route search server 30B, the process advances to step S509, and the route searching means 39 searches for the optimum route from the departure place S to the other candidate connection PX on the basis of the other candidate connection (refer to PX of FIG. 2) information received from the route search server 30B, designates this route as a candidate route, and calculates the required time, at which point the process advances to step S510.

In the process of step S510, the required times of the candidate routes searched by the route search server 30B and the point information of the candidate connections (including additional candidate connections) are received. The required times of the candidate routes received from the route search server 30B are required times of candidate routes from the candidate connections (P1 to P3) received from the route search server 30A to the destination G as well as the required time of the candidate route to the destination G from the candidate connection (PX) extracted by the route search server 30B itself. The received data is stored in the candidate route storing means 372 of the route search server 30A.

When the route search server 30A receives the point information of the candidate connections and the required times of the candidate routes from the route search server 30B, in the process of step S511, the candidate routes searched by the route search server 30A and the required times of the candidate routes received from the route search server 30B are combined in the candidate route combining means 373. The combining of the candidate routes is performed based on the candidate connections. When the required times of the candidate routes are combined, the route having the least required time is determined as the recommended route in the recommended route determining means 33.

When the recommended route is determined, in the process of step S512, the recommended route data (including the candidate connection data) is transmitted to the route search server 30B, and in the process of step S513, link data of the recommended route (link data of the routes from the candidate connections of the recommended route to the destination G) is received from the route search server 30B.

When the recommended route link data is received from the route search server 30B, the process advances to step S514, the route search server 30A adds the recommended route link data received from the route search server 30B to the link data from the departure place S to the candidate connections of the recommended route, obtaining link data of the entire recommended route, and information of the recommended route including this link information is transmitted to the terminal 20. The terminal 20 can request route guidance in accordance with the information of the recommended route received from the route search server 30A.

In FIG. 10, the process of step S601 to step S604 is the same process as the process from step S201 to step S204 of FIG. 7.

In the process of step S604, when the destination and the point information of the candidate connections are received from the route search server 30A, the process advances to step S605, the candidate connection extracting means 371 (the route search server 30B) searches for whether or not there is a candidate connection different from the candidate connections (refer to P1 to P3 in FIG. 2) received from the route search server 30A, and if there is another different candidate connection, it is extracted as an additional candidate connection.

If a different candidate connection is not extracted (NO in step S605), the process advances to step S607. If there is a different candidate connection (refer to PX in FIG. 2) (YES in step S605), the process advances to step S606, the route search server 30B adds the different candidate connection (PX) it has extracted to the candidate connections (P1 to P3) received from the route search server 30A, and the process advances to step S607.

In the process of step S607, the route searching means 39 (the route search server 30B) searches for optimum routes from the candidate connections (P1 to P3, PX) to the destination G as candidate routes. In the process of step S608, the route search server 30B transmits information of the candidate connections of the candidate routes and the required times of the candidate routes to the route search server 30A, advances to the process of step S609, and waits to receive information of the recommended route from the route search server 30A.

When information (the candidate connections) of the recommended route is received from the route search server 30A in the process of step S609, then in the process of step S610, the route search server 30B transmits to the route search server 30A link data of the routes to the destination G from the candidate connections in the recommended route. The link data transmitted herein is link data of a route determined by the route search server 30A to be the recommended route from among the candidate routes searched by the route search server 30B in the process of step S607.

When the route search server 30A receives the link data of the recommended route from the route search server 30B, the recommended route information including the link data of the entire recommended route is transmitted to the terminal 20 as described in the process of step S514 of FIG. 9. The terminal 20 can request route guidance in accordance with the information of the recommended route received from the route search server 30A.

With the route search system according to the present invention as described in detail above, in a case in which route guidance is performed to a location outside of a serviceable area where map data or the like is not carried, all that is carried is information of connections between the serviceable area and an area belonging to the destination area outside of the serviceable area, and guidance information for these routes is used while sharing only the connection information, whereby it is possible to provide seamless route guidance from the departure place in the serviceable area to a destination outside of the serviceable area.

Therefore, when a search is conducted and guidance is provided for a route spanning between countries or regions using roads or transportation systems, route guidance systems provided with country or region-specific map data and route search network data are linked, and a series of route guidance services from the departure place to a destination in another country or region can be smoothly transferred from system to system.

According to the present invention, connection information may, for example, be provided not only for country borders but also for areas carrying map data for each region. Thereby, it is possible for service to be distributed among each region, it is possible to strengthen local information in the serviceable ranges of the distributed individual areas, and it is also possible to segment information management or the fee system.

The invention claimed is:

1. A route guidance system configured from a first route search server, said route guidance system comprising:
    a map database that has a predetermined area as a serviceable area and that stores map data of the area;
    a route search network database for storing road network data and transportation network data of the area; and
    a terminal connected to said first route search server via a network; wherein
    the first route search server has a candidate connection extractor for extracting point information of at least one candidate connection enabling arriving at a different area outside of the serviceable area, and a route searcher for searching for an optimum route as a candidate route between a departure place or a destination and the candidate connection;
    in a case in which a route search request is received from said terminal such that a point inside said serviceable area is the departure place and a point inside the different area outside of said serviceable area is the destination, said first route search server searches for an optimum candidate route from the departure place to said candidate connection, transmits point information of said destination and point information of said candidate connection to a second route search server constituting a second route guidance system whose serviceable area is said different area, and requests that the second route search server search for an optimum candidate route from said candidate connection to the destination; and said second route search server provides said first route search server with link data of said candidate route leading to said destination;
    either said first route search server or said second route search server has a candidate route combiner for combining required times of said respective searched candidate routes on the basis of said candidate connection, and a recommended route determiner for designating as a recommended route the candidate route having the shortest required time on the basis of the required times of the candidate routes combined by said candidate route combiner; and
    said first route search server transmits to said terminal the data of the recommended route from the departure place to the destination, including the link data of the candidate route provided from said second route search server, on the basis of the recommended route determined by said recommended route determiner.

2. The route guidance system according to claim 1, wherein based on the candidate connection information received from said first route search server and the required time of the candidate route of the first server, the candidate route combiner of said second route search server combines the required time of the candidate route searched by said first route search server with the required time of the candidate route from said candidate connection information to said destination; and based on the required time of the combined candidate routes, the recommended route determiner of said second route search server designates the candidate route having the shortest required time as a recommended route, and provides said first route search server with data of the recommended route including link data of the candidate route from said candidate connection to said destination constituting the recommended route.

3. The route guidance system according to claim 1, characterized in that the candidate route combiner of said first route search server receives required times of candidate routes and link data from said second route search server, and combines the candidate route searched by the second route search server and the candidate route searched by said first route search server on the basis of said candidate connection; the recommended route determiner of said first route search server designates the candidate route having the least required time as a recommended route on the basis of the required times of the combined candidate routes; and recommended route data is transmitted to said terminal, the recommended route data including link data of the candidate route from said candidate connection to the destination constituting the recommended route.

4. The route guidance system according to claim 2 or 3, characterized in that said second route search server has a candidate connection extractor, and when a candidate connection that is different from said candidate connection transmitted from said first route search server is extracted on the basis of the point information of said destination, the point information of the different candidate connection is transmitted to said first route search server.

5. The route guidance system according to claim 1, characterized in that, based on the recommended route data received from said first route search server, said terminal requests route guidance from said first route search server when the terminal is located in the area to which said first route search server provides service, and said terminal requests route guidance from said second route search server whose serviceable area is the different area when the terminal is located in said different area.

6. A route guidance method in a route guidance system configured from a first route search server, which comprises a map database that has a predetermined area as a serviceable area and that stores map data of the area, and a route search network database for storing road network data and transportation network data of the area; and a terminal connected to said first route search server via a network; the route search guidance method characterized in that:
the first route search server has a candidate connection extractor for extracting point information of at least one candidate connection enabling arriving at a different area outside of the serviceable area, and a route searcher for searching for an optimum route as a candidate route between a departure place or a destination and the candidate connection;
in a case in which a route search request is received from said terminal such that a point inside said serviceable area is the departure place and a point inside a different area outside of said serviceable area is the destination, the method has a step wherein said first route search server searches for an optimum candidate route from the departure place to said candidate connection, a step wherein point information of said candidate destination and point information of said candidate connection is transmitted to a second route search server constituting a second route guidance system whose serviceable area is said different area and a request is made for a search for an optimum candidate route from said candidate connection to the destination, and a step wherein said second route search server provides said first route search server with link data of said candidate route leading to said destination;
either said first route search server or said second route search server has a candidate route combiner for combining required times of said respective searched candidate routes on the basis of said candidate connection, and a recommended route determiner for designating as a recommended route the candidate route having the shortest required time on the basis of the required times of the candidate routes combined by said candidate route combiner; and
the method has a step wherein, on the basis of the recommended route determined by said recommended route determiner, said first route search server transmits to said terminal the data of the recommended route from the departure place to the destination, including the link data of the candidate route provided from said second route search server.

7. The route guidance method according to claim 6, characterized in comprising a step wherein, based on the candidate connection received from said first route search server and the required time of the candidate route, the candidate route combiner of said second route search server combines the required time of the candidate route searched by said first route search server with the required time of the candidate route from said candidate connection to said destination; a step wherein based on the required time of the combined candidate routes, the recommended route determiner of said second route search server designates the candidate route having the shortest required time as a recommended route; and a step wherein said first route search server is provided with data of the recommended route including link data of the candidate route from said candidate connection to said destination constituting the recommended route.

8. The route guidance method according to claim 6, characterized in comprising a step wherein the candidate route combiner of said first route search server receives required times of candidate routes and link data from said second route search server, and combines the candidate route searched by the second route search server and the candidate route searched by said first route search server on the basis of said candidate connection; a step wherein the recommended route determiner of said first route search server designates the candidate route having the least required time as a recommended route on the basis of the required times of the combined candidate routes; and a step wherein recommended route data is transmitted to said terminal, the recommended route data including link data of the candidate route from said candidate connection to the destination constituting the recommended route.

9. The route guidance method according to claim 7 or 8, characterized in that said second route search server has a candidate connection extractor, and the method has a step wherein, in case where a candidate connection that is different from said candidate connection transmitted from said first route search server is extracted on the basis of the point information of said destination, said second route search server transmits to said first route search server the point information of the different candidate connection.

10. The route guidance method according to claim 6, characterized in comprising a step wherein, based on the recommended route data received from said first route search server, said terminal requests route guidance from said first route search server when the terminal is located in the area to which said first route search server provides service; and a step wherein said terminal requests route guidance from said second route search server whose serviceable area is the different area when the terminal is located in said different area.

11. A route search server configured from a route search server comprising a map database which has a predetermined area as a serviceable area and which stores map data of the area, and a route search network database which stores road network data and transportation network data of the area; and a terminal connected to said route search server via a network; the route search server characterized in that:

said route search server has a candidate connection extractor for extracting point information of at least one candidate connection enabling arriving at a different area outside of the serviceable area, and a route searcher for searching for an optimum route as a candidate route between a departure place or a destination and said candidate connection;

in a case in which a route search request is received from said terminal such that a point inside said serviceable area is the departure place and a point inside a different area outside of said serviceable area is the destination, said route search server searches for an optimum candidate route from the departure place to said candidate connection, transmits point information of said destination and point information of said candidate connection to a second route search server whose serviceable area is said different area, and requests that the second route search server search for an optimum candidate route from said departure place to the destination via said candidate connection; and said second route search server provides said route search server with link data of said candidate route leading to said destination;

either said route search server or said second route search server has a candidate route combiner for combining required times of said respective searched candidate routes for designating as a recommended route the candidate route having the shortest required time on the basis of the required times of the candidate routes combined by said candidate route combiner; and said route search server transmits to said terminal the data of the recommended route from the departure place to the destination, including the link data of the candidate route provided from said second route search server, on the basis of the recommended route determined by said recommended route determiner.

12. The route search server according to claim 11, characterized in that based on the candidate connection received from said route search server and the required time of the candidate route, the candidate route combiner of said second route search server combines the required time of the candidate route searched by said route search server with the required time of the candidate route from said candidate connection to said destination; based on the required time of the combined candidate routes, the recommended route determiner of said second route search server designates the candidate route having the shortest required time as a recommended route, and provides said route search server with data of the recommended route including link data of the candidate route from said candidate connection to said destination constituting the recommended route; and said route search server transmits to said terminal the data of the recommended route including link data of the candidate route provided from said second route search server.

13. The route search server according to claim 11, characterized in that the candidate route combiner of said route search server receives required times of candidate routes and link data from said second route search server, and combines the candidate route searched by the second route search server and the candidate route searched by said route search server on the basis of said candidate connection; the recommended route determiner of said route search server designates the candidate route having the least required time as a recommended route on the basis of the required times of the combined candidate routes; and recommended route data is transmitted to said terminal, the recommended route data including link data of the candidate route from said candidate connection to the destination constituting the recommended route.

14. The route search server according to claim 12 or 13, characterized in that said second route search server has a candidate connection extractor, and when a candidate connection that is different from said candidate connection transmitted from said route search server is extracted on the basis of the point information of said destination, the point information of the different candidate connection is transmitted to said route search server.

15. A terminal in a route guidance system configured from a route search server comprising a map database which has a predetermined area as a serviceable area and which stores map data of the area, and a route search network database which stores road network data and transportation network data of the area; and a terminal connected to said route search server via a network; the terminal characterized in that:

said route search server has a candidate connection extractor for extracting point information of at least one candidate connection enabling arriving at a different area outside of the serviceable area, and a route searcher for searching for an optimum route as a candidate route between a departure place or a destination and said candidate connection; in a case in which a route search request is received from said terminal such that a point inside said serviceable area is the departure place and a point inside a different area outside of said serviceable area is the destination, said route search server searches for an optimum candidate route from the departure place to said candidate connection, transmits point information of said destination and point information of said candidate connection to a second route search server whose serviceable area is said different area, and requests that the second route search server search for an optimum candidate route from said candidate connection to the destination; and said second route search server provides said route search server with link data of said candidate route leading to said destination;

either said route search server or said second route search server has a candidate route combiner for combining required times of said respective searched candidate routes on the basis of said candidate connection, and a recommended route determiner for designating as a recommended route the candidate route having the shortest required time on the basis of the required times of the candidate routes combined by said candidate route combiner;

said route search server is a route search server which transmits to said terminal the data of the recommended route from the departure place to the destination, including the link data of the candidate route provided from said second route search server, on the basis of the recommended route determined by said recommended route determiner; and said terminal transmits to said route search server a route search request such that a point inside the serviceable area is the departure place and a point inside a different area outside of said serviceable area is the destination.

16. The terminal according to claim 15, characterized in that based on the recommended route data received from said route search server, said terminal requests route guidance from said route search server when the terminal is located in the serviceable area of said route guidance system, and said terminal requests route guidance from said second route search server whose serviceable area is the different area when the terminal is located in said different area.

* * * * *